(12) United States Patent
Toriumi et al.

(10) Patent No.: US 11,337,546 B2
(45) Date of Patent: *May 24, 2022

(54) BEVERAGE SUPPLY APPARATUS

(71) Applicant: SANDEN RETAIL SYSTEMS CORPORATION, Isesaki (JP)

(72) Inventors: Takahiro Toriumi, Isesaki (JP); Takashi Nagasawa, Isesaki (JP); Yuji Ebihara, Isesaki (JP)

(73) Assignee: SANDEN RETAIL SYSTEMS CORPORATION, Gunma (JP)

( * ) Notice: Subject to any disclaimer, the term of this patent is extended or adjusted under 35 U.S.C. 154(b) by 378 days.

This patent is subject to a terminal disclaimer.

(21) Appl. No.: 16/498,735

(22) PCT Filed: Feb. 9, 2018

(86) PCT No.: PCT/JP2018/005608
§ 371 (c)(1),
(2) Date: Sep. 27, 2019

(87) PCT Pub. No.: WO2018/179984
PCT Pub. Date: Oct. 4, 2018

(65) Prior Publication Data
US 2021/0186257 A1 Jun. 24, 2021

(30) Foreign Application Priority Data
Mar. 28, 2017 (JP) .............. JP2017-063084

(51) Int. Cl.
*A47J 31/46* (2006.01)
*A47J 31/44* (2006.01)
*A47J 31/52* (2006.01)

(52) U.S. Cl.
CPC ......... *A47J 31/461* (2018.08); *A47J 31/4485* (2013.01); *A47J 31/4496* (2013.01);
(Continued)

(58) Field of Classification Search
CPC .... A47J 31/4485; A47J 31/461; A47J 31/462; A47J 31/468; A47J 31/5253; A47J 31/469; A47J 31/4496; A47J 31/60; A47J 31/52
(Continued)

(56) References Cited
U.S. PATENT DOCUMENTS

2011/0256289 A1* 10/2011 Steiner ................ A47J 31/4485
426/523
2013/0319259 A1* 12/2013 Ait Bouziad ........... A47J 31/44
99/453
(Continued)

FOREIGN PATENT DOCUMENTS

CN  1682586     10/2005
CN  102245067   11/2011
(Continued)

OTHER PUBLICATIONS

Office Action dated Dec. 3, 2020 issue in Chinese Patent Application No. 201880022845.7.
(Continued)

*Primary Examiner* — Phuong T Nguyen
(74) *Attorney, Agent, or Firm* — Cozen O'Connor

(57) ABSTRACT

Beverage supply apparatus (100) has milk tank (3), milk flow path (L3) connecting the milk tank to beverage delivery port (10), first pump (7), air flow path (L6) to supply air via its connection portion (Z1), and third pump (9). The apparatus drives the third pump to supply air to the milk flow path, and drives the first pump to thereby deliver and supply a mixed beverage of milk and air from the beverage delivery port. The apparatus includes path (L7) for releasing a portion of the air flowing through the air flow path, one end portion of which is connected to release point (Z8) which is a predetermined portion of the air flow path between a beverage flow path side end portion (location of a connection
(Continued)

portion (Z6)) and the third pump. The other end portion thereof is open to the outside.

7 Claims, 8 Drawing Sheets

(52) U.S. Cl.
CPC .......... *A47J 31/462* (2013.01); *A47J 31/468* (2018.08); *A47J 31/52* (2013.01)

(58) Field of Classification Search
USPC ......... 99/275, 281, 286, 295, 300, 330, 403, 99/408, 472, 453, 493
See application file for complete search history.

(56) References Cited

U.S. PATENT DOCUMENTS

| | | |
|---|---|---|
| 2014/0197554 A1 | 7/2014 | Boensch et al. |
| 2015/0289710 A1 | 10/2015 | van Druten et al. |

FOREIGN PATENT DOCUMENTS

| | | |
|---|---|---|
| CN | 103327857 | 9/2013 |
| CN | 104853655 | 8/2015 |
| CN | 105030071 | 11/2015 |
| DE | 102011102734 | 11/2012 |
| JP | 2014-502903 | 2/2014 |
| JP | 2014-208316 | 11/2014 |
| JP | 2015-536708 | 12/2015 |
| WO | WO 2015/028592 | 3/2015 |

OTHER PUBLICATIONS

Preliminary Report on Patentability dated Oct. 10, 2019 issued in International Patent Application No. PCT/JP2018/005608.
Office Action dated Oct. 7, 2021 issue in German Patent Application No. 112018001735.4.
Office Action dated Feb. 3, 2021 issue in Japanese Patent Application No. 2017-063084.
Office Action dated Feb. 23, 2021 issue in Korean Patent Application No. 10-2019-7031466.

* cited by examiner

BEVERAGE SUPPLY APPARATUS

RELATED APPLICATIONS

This is a U.S. National Phase Application under 35 USC 371 of International Application PCT/JP2018/005608 filed on Feb. 9, 2018.

This application claims the priority of Japanese application no. 2017-063084 filed on Mar. 28, 2017, the entire content of which is hereby incorporated by reference.

TECHNICAL FIELD

The present invention relates to a beverage supply apparatus supplying a mixed beverage consisting of a liquid beverage and air.

BACKGROUND ART

Patent Document 1 discloses a coffeemaker equipped with a milk container storing milk, a pump provided at some midpoint of piping between the milk container and a beverage outlet and drawing in and conveying the milk in the milk container, and an air amount adjusting device provided in an air supply pipe connected to piping between the milk container and the pump and capable of adjusting the flow rate of air circulating through this air supply pipe. In this coffeemaker, a predetermined amount of air is mixed with the milk in the piping between the milk container and the pump via the air supply pipe and the air amount adjusting device, and the pump is driven, whereby foamy milk froth (also referred to as foamed milk; hereinafter, referred to as the foamed milk) is generated as a mixed beverage consisting of milk and air, and this mixed beverage is supplied into a cup via the outlet.

In this connection, the taste of people provided with beverage such as coffee has become progressively diversified. In the circumstances, there is a demand for adjustment in accordance with the diversification in taste also regarding the mixed beverage supplied by this kind of beverage supply apparatus.

In this regard, the coffeemaker disclosed in Patent Document 1 can adjust the mixing ratio of the milk and the air in the mixed beverage, in other words, the ratio of the air in the mixed beverage, by adjusting the amount of air mixed with the milk by the air amount adjustment device, making it possible to mix a specified amount of air with the milk for frothing.

REFERENCE DOCUMENT LIST

Patent Document

Patent Document 1: JP 2014-208316 A

SUMMARY OF THE INVENTION

Problem to be Solved by the Invention

In the coffeemaker disclosed in Patent Document 1, the foamed milk obtained by mixing air with the milk is poured onto the coffee beverage in the cup. For example, it is supplied as the milk in the surface layer of a cappuccino or the like. It exhibits scarcely any stickiness and does not have such high viscosity as to be sufficient to form a peak like a meringue. In the following, a mixed beverage consisting of milk and air of such high viscosity as to be sufficient to form a peak like a meringue is referred to as a hard mixed beverage of relatively high viscosity (in other words, hard foam), and the above-mentioned foamed milk is referred to as a soft (loose) mixed beverage of relatively low viscosity (in other words, soft foam).

Here, to meet the further diversity in the taste for beverage in recent years, the present inventor conducted an experiment in which milk and air are mixed with each other to produce a mixed beverage of higher viscosity than the above-mentioned foamed milk (a mixed beverage capable of forming a peak like a meringue). As a result, the present inventor has experimentally confirmed that the larger the amount of air mixed with the milk, the higher the viscosity of the mixed beverage is, and that it is necessary to accurately set the amount of air to be mixed with the milk to produce a mixed beverage of a predetermined viscosity. Then, the present inventor has confirmed that when, for example, the delivery pressure and delivery flow rate performance of the air supply pump itself for supplying the air to be mixed with the milk is excessive, even if the amount of air is adjusted by providing the air amount adjusting device in the air supply pipe as in the case of the coffeemaker disclosed in Patent Document 1, it is difficult or impossible to produce a mixed beverage of a predetermined viscosity with satisfactory reproducibility. Further, a similar problem is involved not only in the apparatus for supplying the mixed beverage of milk and air but also in an apparatus for supplying an appropriate mixed beverage of some other liquid beverage and air.

In view of the above circumstances, it is an object of the present invention to provide a beverage supply apparatus capable of producing a mixed beverage of a predetermined viscosity with satisfactory reproducibility.

Means for Solving the Problem

According to an aspect of the present invention, there is provided a beverage supply apparatus including: a tank storing a liquid beverage; a beverage flow path connecting the tank and a beverage delivery port; a beverage conveying pump provided in the beverage flow path; an air flow path for causing air to be supplied to the beverage supply path to flow via a predetermined portion of the beverage flow path between the tank and the beverage conveying pump; and an air supply pump provided in the air flow path. The beverage supply apparatus drives the air supply pump to supply air into the beverage flow path and drives the beverage conveying pump, thereby delivering and supplying a mixed beverage of the liquid beverage and the air from the beverage delivery port. The beverage supply apparatus also includes a release path for discharging a portion of the air flowing through the air flow path to the outside. One end portion of the release path is connected to a release point that is a predetermined portion of the air flow path between a beverage flow path side end portion and the air supply pump, and the other end portion of the release path is open to the outside.

Effects of the Invention

In the beverage supply apparatus according to one aspect of the present invention, a portion of the air flowing through the air flow path can be discharged to the outside via the release path one end portion of which is connected to the release point that is a predetermined portion of the air flow path between the beverage flow path side end portion and the air supply pump. That is, during a mixed beverage supply operation, in which the air supply pump is driven to supply air into the beverage flow path, and in which by driving the beverage conveying pump, the mixed beverage of the liquid beverage and the air is delivered and supplied from the beverage delivery port, a portion of the air delivered from the air supply pump is discharged to the outside via the release path.

As a result, in the case, for example, in which it is impossible to select the air supply pump having an appropriate delivery pressure and delivery flow rate performance for producing the mixed beverage having a predetermined viscosity, and where there is nothing for it but to adopt an air supply pump having an excessive performance, it is possible to discharge a portion of the air delivered from this air supply pump via the release path, and to supply the remaining air to the beverage flow path via the air flow path on the downstream side of the release point. Thus, for example, solely by appropriately setting the flow path sectional area of the release path in accordance with the delivery flow rate of the air supply pump having an excessive performance, it is possible to supply an amount of air corresponding to the predetermined viscosity to the beverage flow path. As a result, even in the case in which there is nothing for it but to adopt an air supply pump having an excessive performance, the beverage supply apparatus can produce the mixed beverage of the predetermined viscosity with satisfactory reproducibility.

In this way, it is possible to provide a beverage supply apparatus capable of producing the mixed beverage of a predetermined viscosity with satisfactory reproducibility.

MODE FOR CARRYING OUT THE INVENTION

[Basic Structure of the Beverage Supply Apparatus]

In the following, embodiments of the present invention will be described with reference to the attached drawings.

Figure 1:
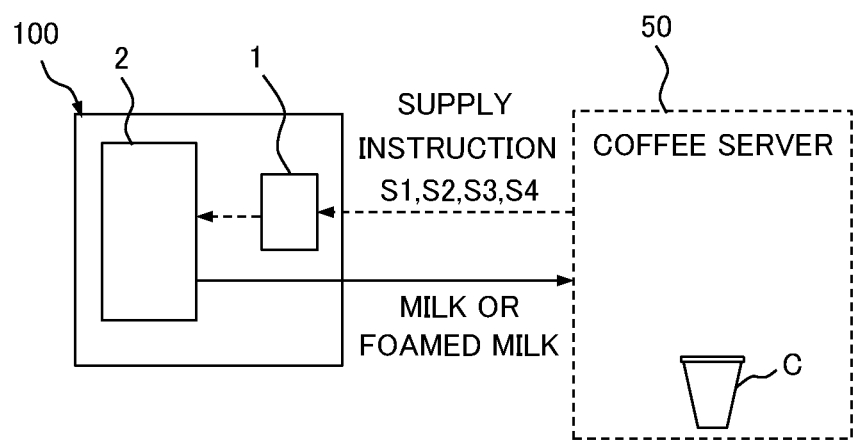
FIG. 1 is a block diagram schematically illustrating the structure of a beverage supply apparatus according to a first embodiment of the present invention.
Figure 2:
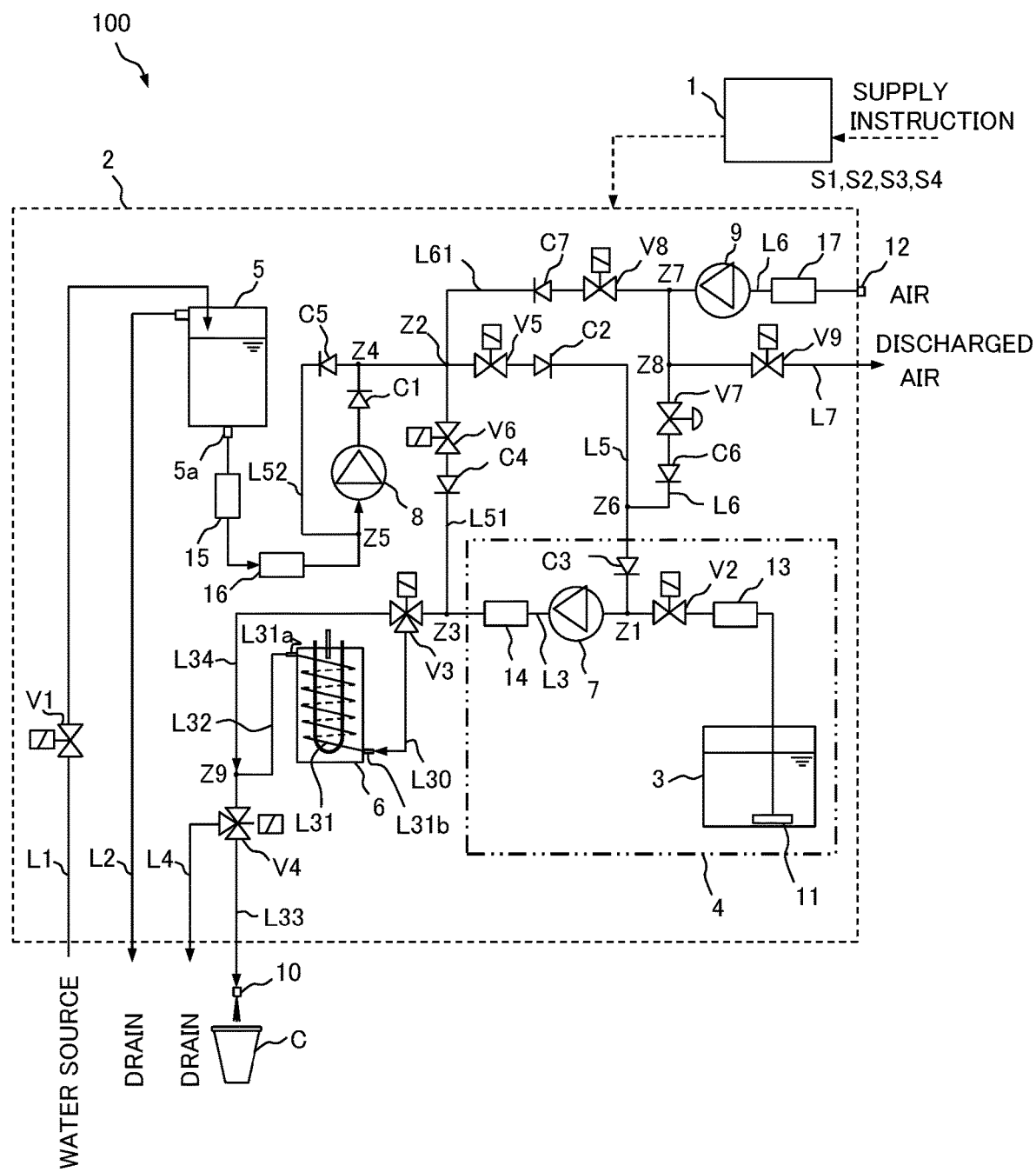
FIG. 2 is a piping circuit diagram of the beverage supply apparatus.

FIG. 1 is a block diagram for schematically illustrating the structure of a beverage supply apparatus 100 according to the first embodiment of the present invention, and FIG. 2 is a piping circuit diagram of the beverage supply apparatus 100.

As illustrated in FIG. 1, this beverage supply apparatus 100 is provided adjacent to a coffee server 50. In the example described below, it is used as an option apparatus of the coffee server 50.

In the coffee server 50, coffee is extracted by using, for example, coffee powder, and the extracted coffee is served in a cup C. In accordance with the request of the client or the like, the coffee server 50 adds to the extracted coffee liquid milk as the liquid beverage (in the following, simply referred to as milk), foamed milk (that is, a mixed beverage of milk and air of a relatively low viscosity), or whipped milk (that is, a mixed beverage of milk and air of high viscosity), thus making it possible to provide coffee in a form as required.

The distinction between foamed milk and whipped milk is not clear. In the following, in the case in which there is no need to distinguish them from each other, foamed milk and whipped milk will be collectively referred to as mixed beverage. In the case in which they are to be distinguished from each other, foamed milk will be referred to as a mixed beverage of a relatively low viscosity, or a soft mixed beverage, or a loose mixed beverage, or soft foam as appropriate, and whipped milk will be referred to a mixed beverage of a relatively high viscosity, or a hard mixed beverage, or a stiff mixed beverage capable of forming a peak, or hard foam as appropriate.

The beverage supply apparatus 100 is an apparatus capable of supplying milk or a mixed beverage in a heated (warmed) state or in a cooled state, and has a control unit 1 and an apparatus main body portion 2. As stated above, the beverage supply apparatus 100 is provided adjacent to the coffee server 50, and supplies milk or a mixed beverage into the cup C provided in the coffee server 50.

As illustrated in FIG. 1, the control unit 1 controls the operation of the apparatus main body portion 2, and, based, for example, on an instruction from the coffee server 50, controls the operation of the devices of the apparatus main body portion 2 (a cooling storage 4, a heating device 6, pumps 7 through 9, and valves V1 through V9 described below) so as to supply milk or a mixed beverage in a heated state or in a cooled state. The beverage supply apparatus 100 controls the operation of each device such that it supplies hot (warm) milk when a hot milk supply instruction S1 is input to the control unit 1, that it supplies a hot (warm) mixed beverage when a hot mixed beverage supply instruction S2 is input to the control unit 1, that it supplies cold milk when a cold milk supply instruction S3 is input to the control unit 1, and that it supplies a cold mixed beverage when a cold mixed beverage supply instruction S4 is input to the control unit 1. In the case in which none of the supply instructions (S1 through S4) is input to the control unit 1, the beverage supply apparatus 100 is placed in a standby state.

In the present embodiment, as illustrated in FIG. 2, the apparatus main body portion 2 includes a milk tank 3, the cooling storage 4, a water tank 5, the heating device 6, a first pump 7, a second pump 8, and a third pump 9. By driving the third pump 9, air is supplied into a milk flow path L3 described below, and by driving the first pump 7, the mixed beverage of milk and air is delivered and supplied from a beverage delivery port 10.

The milk tank 3 is a tank storing milk as the liquid beverage. In the present embodiment, the milk tank 3 is accommodated in the cooling storage 4, and can store milk at an appropriate low temperature. In the present embodiment, the milk tank 3 corresponds to the tank according to the present invention.

The cooling storage 4 accommodates at least the milk tank 3, and can maintain the inner temperature at an appropriate low set temperature. In the present embodiment, inside the cooling storage 4, there are arranged devices such as the first pump 7 in addition to the milk tank 3. The internal temperature of the cooling storage 4 is controlled so as to be maintained, for example, at less than 10° C., more specifically, in the range of 2 to 3° C.

The water tank 5 is a tank storing water. Supplied to the water tank 5 is water from a water source via a water supply path L1 opened and closed by, for example, an electromagnetic first opening/closing valve V1. Further, overflow water from the water tank 5 can be drained via an overflow conduit L2.

The heating device 6 is a device for heating milk or the mixed beverage, and is configured to heat a heating pipe L31 constituting a part of a milk flow path L3 connecting the milk tank 3 to the beverage delivery port 10. In the present embodiment, the milk flow path L3 corresponds to the beverage flow path according to the present invention.

In the present embodiment, in both the state in which a beverage (milk or mixed beverage) supply instruction (S1 through S4) is input from the coffee server 50 and the standby state in which no supply instruction (S1 through S4) is input, the heating device 6 heats the heating pipe L31 so as to maintain a predetermined heating set temperature. More specifically, in the state in which the beverage supply apparatus 100 has been started (main power source: ON), it is to be assumed that the heating device 6 is constantly supplying electricity to an electric heater 6b, described below.

In the present embodiment, the milk flow path L3 connects a strainer 11 arranged in the milk tank 3 to the beverage delivery port 10, and is a flow path allowing flowing of mainly milk and the mixed beverage. The milk flow path L3 includes, for example, an inflow pipe L30, the heating pipe L31, a delivery pipe L32, an outlet pipe L33, and a bypass pipe L34.

The inlet pipe L30 is arranged on the upstream side of the heating device 6. One end portion thereof is connected to a first switching valve V3 described below, and the other end portion thereof is connected to an inlet side end portion L31b (described below) of the heating pipe L31. As described below, the heating pipe L31 is provided in the heating device 6. The delivery pipe L32 is arranged on the downstream side of the heating device 6. One end portion thereof is connected to an outlet side end portion L31a of the heating pipe L31, and the other end portion thereof is connected to a second switching valve V4. The outlet pipe L33 connects the outlet side end portion (the portion in FIG. 2 to which a second switching valve V4 (described below) is connected) to the beverage delivery port 10. The bypass pipe L34 is provided so as to bypass the heating pipe L31. Further, a drain pipe L4 is connected to the outlet side end portion of the delivery pipe L32. The portion of the milk flow path L3 other than the heating pipe L31 consists, for example, of a silicone hose or a fluorine hose. On the other hand, the heating pipe L31 consists, for example, of a stainless steel pipe that is spirally wound. The beverage delivery port 10 is, for example, a nozzle portion through which milk and mixed beverage is delivered and which is arranged above the cup C.

Figure 3:
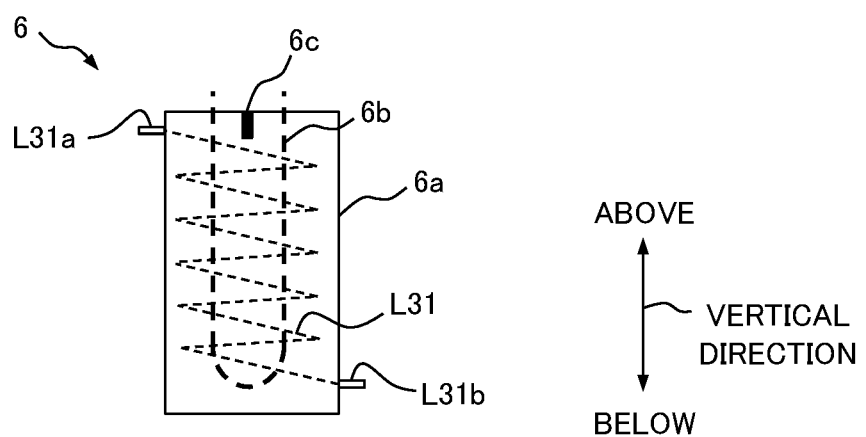
FIG. 3 is a side view of a heating device of the beverage supply apparatus.

FIG. 3 is a side view of the heating device 6. More specifically, as illustrated in FIG. 3, the heating device 6 includes, for example, a main body 6a consisting of an aluminum casting of a rectangular parallelepiped configuration, a U-shaped electric heater 6b cast into the main body 6a, and a temperature detection sensor 6c inserted into a hole provided in the upper side portion of the main body 6a.

Cast into the main body 6a are the heating pipe L31 and the electric heater 6b. The outlet side end portion L31a of the heating pipe L31 protrudes outwards from a predetermined portion vertically above one side portion of the main body 6a, and the inlet side end portion L31b of the heating pipe L31 protrudes outwards from a predetermined portion vertically below the side portion opposite the one side portion of the main body 6a. The temperature in the main body 6a is detected by a temperature detection sensor 6c, and is input, for example, to the control unit 1. The control unit 1 controls the input electric current or the like of the electric heater 6b based on the detection temperature from the temperature detection sensor 6c, and performs control such that the temperature in the main body 6a is maintained at a predetermined heating temperature. When the main body 6a is heated by the electric heater 6b, the heating pipe L31 cast into the main body 6a is also heated. In the state in which the heating set temperature of the heating device 6 is set substantially to 75° C., when cold milk or cold mixed beverage is caused to flow through the heating pipe L31, hot milk or hot mixed beverage heated to an adequate temperature flows out of the outlet side end portion L31a.

The first pump 7 is a delivery pump which mainly draws and delivers milk from the milk tank 3. It is provided at a predetermined portion in the milk flow path L3 closer to the milk tank 3 than the heating pipe L31. More specifically, the first pump 7 is provided on the upstream side of a branching portion to the bypass pipe L34 (In FIG. 2, a first switching valve V3 described below) of the milk flow path L3 and at a predetermined portion of the milk flow path L3 in the cooling storage 4. In the present embodiment, the first pump 7 corresponds to the beverage conveying pump according to the present invention.

The second pump 8 is a pump drawing water from the water tank 5 and delivering it, and is provide in the water flow path L5. The second pump 8 is a pump for supplying water (rinsing water) for rinsing and cleansing the interior of the milk flow path L3 after supplying water, milk, or mixed beverage to fill the milk supply path L3 in the standby state of the beverage supply apparatus 100.

One end portion of the water flow path L5 is connected to an outlet portion 5a provided at the bottom portion of the water tank 5, and the other end portion thereof is connected to a predetermined portion (hereinafter referred to as a connection portion Z1) of the milk flow path L3 between the first pump 7 and the strainer 11. Further, in the present embodiment, there is provided a bypass pipe L51 branching off from a predetermined portion (hereinafter referred to as a connection portion Z2) of the water flow path L5 on the downstream side of the second pump 8. One end portion of this bypass pipe L51 is connected to the connection portion Z2, and the other end portion thereof is connected to a predetermined portion (hereinafter referred to as a connection portion Z3) of the milk flow path L3 between a branching portion of the bypass pipe L34 from the inflow pipe L30 (In FIG. 2, the first switching valve V3 described below) and the first pump 7. When rinsing the interior of the milk flow path L3 including the portion (internal piping) in the cooling storage 4 of the milk flow path L3, water is supplied to the interior of the milk flow path L3 via the connection portion Z1. When rinsing the portion of the milk flow path L3 other than the cooling storage 4 (external piping), water is supplied to the interior of the milk flow path L3 via the bypass pipe L51 and the connection portion Z3. Further, in the present embodiment, there is provided in the water flow path L5 a return pipe L52 so as to bypass the second pump 8. One end portion of this return pipe L52 is connected to a predetermined portion (hereinafter referred to as a connection portion Z4) between the connection portion Z2 and the second pump 8, and the other end portion thereof is connected to a predetermined portion (hereinafter referred to as a connection portion Z5) between the second pump 8 and the outlet portion 5a of the water tank 5.

The third pump 9 is a pump provided in the air flow path L6, and draws in and delivers air. The third pump 9 supplies air for producing mixed beverage and air for air purge or the like in the milk flow path L3, etc. That is, in the present embodiment, one third pump 9 serves both as the pump for supplying air for producing mixed beverage and as the pump for supplying air for air purge. The third pump 9 is a delivery flow rate fixed pump delivering a predetermined discharge flow rate of air. The beverage supply apparatus 100 drives this third pump 9 to supply air to the interior of the milk flow path L3, and drives the first pump 7 to thereby produce a mixed beverage of milk and air, delivering the mixed beverage from the beverage delivery port 10 to supply it into the cup C. In the present embodiment, the third pump 9 corresponds to the air supply pump according to the present invention.

The air flow path L6 is a flow path for mainly circulating air to be supplied to the milk flow path L3. For example, one end portion of the air flow path L6 is connected to an air intake port 12 open to the outside, and the other end portion thereof is connected to a predetermined portion (hereinafter referred to as the connection portion Z6) of the water flow path L5 between the connection portion Z1 and the connection portion Z2. The air supplied from the connection portion Z6 to the water flow path L5 flows through the flow path that is a part of the water flow path L5 and extends between the connection portion Z6 and the connection portion Z1, and is eventually supplied to the milk flow path L3 via the connection portion Z1 between the first pump 7 and the strainer 11 of the milk flow path L3. In this way, there is formed the air flow path L6 for circulating air supplied to the milk flow path L3 via the predetermined portion (the connection portion Z1 in the present embodiment) of the milk flow path L3 between the milk tank 3 and the first pump 7.

In the present embodiment, there is provided a bypass pipe L61 branching off from a branching portion Z7 on the downstream side of the third pump 9 of the air flow path L6. One end portion of the bypass pipe L61 is connected to the branching portion Z7, and the other end portion thereof is connected to the connection portion Z2 of the water flow path L5. The air flow path L6 mainly circulates the air for producing the mixed beverage, and the bypass pipe L61 circulates the air for air purge.

Further, in the present embodiment, connected to some midpoint of the air flow path L6 is a release path (relief flow path) L7 for releasing a portion of the air circulating through the air flow path L6. One end portion of the release path L7 is connected to a release point Z8 which is a predetermined portion of the air flow path L6 between the milk flow path side end portion (the connection portion Z6 in FIG. 2) and the third pump 9, and the other end portion thereof is open to the outside.

Next, the milk flow path L3, the water flow path L5, the bypass pipe L51, the return pipe L52, the air flow path L6, the bypass pipe L61, and the devices provided in the release path L7 will be described in detail.

In the milk flow path L3, there are provided the strainer 11, a milk flow meter 13, the second opening/closing valve V2, the first pump 7, a swollen portion 14, a first switching valve V3, the heating device 6, and a second switching valve V4 in that order from the milk tank 3 side toward the beverage delivery port 10. The connection portion Z1 is situated between the second opening/closing valve V2 and the first pump 7, and the connection portion Z3 is situated between the swollen portion 14 and the first switching valve V3.

The milk flow meter 13 is, for example, a propeller rotation type flow meter, outputting a pulse signal to the control unit 1 for each rotation. Based on the number of times that this pulse signal is output, the control unit 1 can monitor the milk delivery volume by the first pump 7.

The second opening/closing valve V2 is a valve opening and closing the milk flow path L3. For example, it consists of an electromagnetic drive type pinch valve which is closed (NC) in the initial state (power source OFF).

The first switching valve V3 is a valve for selectively switching the flow route of milk, etc. in the milk flow path L3 between the route via the heating pipe L31 and the route via the bypass pipe L34 and consists, for example, of an electromagnetic drive type three-way valve. For example, in the initial state (power source OFF), the first switching valve V3 establishes communication between the connection portion Z3 and the bypass pipe L34, and, at the same time, prevents communication between the connection portion Z3 and the heating pipe L31 (more specifically, the inflow pipe L30). In the electricity supply state (power source ON), it prevents communication between the connection portion Z3 and the bypass pipe L34, and, at the same time, establishes communication between the connection portion Z3 and the heating pipe L31 (more specifically, the inflow pipe L30).

The second switching valve V4 is a valve for selectively switching the delivery destination of milk, etc. flowing through the milk flow path L3 between the beverage delivery port 10 (the outlet pipe L33) and the drain pipe L4, and consists, for example, of an electromagnetic drive type three-way valve. That is, the second switching valve V4 is a valve selectively switching the connection destination of the delivery pipe L32 between the outlet pipe L33 connected to the beverage delivery port 10 and the drain pipe L4. For example, in the initial state (power source OFF), the second switching valve V4 operates so as to establish communication between the delivery pipe L32 and the drain pipe L4 and as to prevent communication between the delivery pipe L32 and the outlet pipe L33. In the electricity supply state (power source ON), it operates so as to prevent communication between the delivery pipe L32 and the drain pipe L4 and as to establish communication between the delivery pipe L32 and the outlet pipe L33.

In the water flow path L5, there are provided the strainer 15, the water flow meter 16, the second pump 8, a first check valve C1, a third opening/closing valve V5, a second check valve C2, and a third check valve C3 in that order from the outlet portion 5a side of the water tank 5 toward the connection portion Z1. The connection portion Z2 is situated at a predetermined portion between the first check valve C1 and the third opening/closing valve V5, the connection portion Z4 is situated between the first check valve C1 and the connection portion Z2, the connection portion Z5 is situated between the water flow meter 16 and the second pump 8, and the connection portion Z6 is situated between the second check valve C2 and the third check valve C3.

Like the milk flow meter 13, the water flow meter 16 consists, for example, of a propeller rotation type flow meter, and is configured to output a pulse signal to the control unit 1 for each rotation. Based on the number of times that this pulse signal is output, the control unit 1 can monitor the volume of water delivered by the second pump 8.

The third opening/closing valve V5 is a valve opening and closing the water flow path L5, and consists, for example, of an electromagnetic drive type pinch valve that is closed (NC) in the initial state (power source OFF). The first check valve C1, the second check valve C2, and the third check valve C3 allows the flow from the outlet portion 5a toward the connection portion Z1, and prevents the flow from the connection portion Z1 toward the outlet portion 5a. The opening pressures of these check valves (C1, C2, and C3) are set such that they are quickly opened when the second pump 8 operates.

In the bypass pipe L51, there are provided a fourth opening/closing valve V6 and a fourth check valve C4 in that order from the connection portion Z2 toward the connection portion Z3.

The fourth opening/closing valve V6 is a valve opening and closing the bypass pipe L51, and consists, for example, of an electromagnetic drive type pinch valve that is closed (NC) in the initial state (power source OFF).

The fourth check valve C4 allows the flow from the connection portion Z2 toward the connection portion Z3 and prevents the flow from the connection portion Z3 toward the connection portion Z2. The set value of the opening pressure of the fourth check valve C4 is the same as the set value of the opening pressure of the check valves (C1 through C3) provided in the water flow path L5.

Provided in the return pipe L52 is a fifth check valve C5 allowing the flow from the connection portion Z4 toward the connection portion Z5 and preventing the flow from the connection portion Z5 toward the connection portion Z4. The opening pressure of this fifth check valve C5 is set so as to be higher than the pressure generated at the time of normal operation of the second pump 8. That is, the set value of the opening pressure of the fifth check valve C5 is higher than the set value of the opening pressure of the check valves (C1 through C4) provided in the water flow path L5 and the bypass pipe L51. The fifth check valve C5 is configured such that in the case in which abnormality is generated on the downstream side of the second pump 8, it is opened to allow circulation of water via the return pipe L52.

Provided in the air flow path L6 are a strainer 17, a third pump 9, a first flow rate adjustment valve V7, and a sixth check valve C6, in this order, from the air intake port 12 toward the connection portion Z6. The branching portion Z7 is situated at a predetermined portion between the third pump 9 and the first flow rate adjustment valve V7, and a release point Z8 is situated between the branching portion Z7 and the first flow rate adjustment valve V7. In a bypass pipe L61 branching off from the branching portion Z7 of the air flow path L6, there are provided a fifth opening/closing valve V8 and a seventh check valve C7 in that order from the branching portion Z7 toward the connection portion Z2.

The first flow rate adjustment valve V7 is provided in a flow path that is a part of the air flow path L6 and extends between the connection portion Z6 and the release point Z8, and serves to adjust the flow rate of air flowing through this flow path (hereinafter referred to as the air flow rate) F. It is a control valve capable of continuously adjusting the valve opening degree G based, for example, on a predetermined input signal. In the present embodiment, based, for example, on an input signal from the control unit 1, the first flow rate adjustment valve V7 continuously adjusts the valve opening degree G from the fully closed state to the fully open state, making it possible to adjust the air flow rate F of the air flowing through the air flow path L6 (more specifically, the flow path extending between the connection portion Z6 and the release point Z8). By appropriately adjusting the valve opening degree G of this first flow rate adjustment valve V7, it is possible to adjust the mixture ratio of milk and air in the mixed beverage, that is, the ratio of air in the mixed beverage. The relationship between the ratio of air in the mixed beverage and the viscosity of the mixed beverage, and the relationship between the valve opening degree G of the first flow rate adjustment valve V7 and the air flow rate F will be described in detail below.

The fifth opening/closing valve V8 is a valve opening and closing the bypass pipe L61, and consists, for example, of an electromagnetic drive type pinch valve that is closed (NC) in the initial state (power source OFF).

The sixth check valve C6 serves to allow the flow from the branching portion Z7 toward the connection portion Z6 and to prevent the flow from the connection portion Z6 toward the branching portion Z7. The seventh check valve C7 serves to allow the flow from the branching portion Z7 toward the connection portion Z2, and to prevent the flow from the connection portion Z2 toward the branching portion Z7. The set value of the opening pressure of the sixth check valve C6 and the seventh check valve C7 is the same as the set value of the opening pressure of the check valves (C1 through C4) provided in the water flow path L5 and the bypass pipe L51, and is set so as to quickly open the valve when the third pump 9 operates.

The release path L7 is provided with a sixth opening/closing valve (relief valve) V9. The sixth opening/closing valve V9 is an opening/closing valve opening and closing the release path L7. It consists, for example, of an electromagnetic drive type pinch valve that is closed (NC) in the initial state (power source OFF). In the present embodiment, the sixth opening/closing valve V9 corresponds to the release path opening/closing valve according to the present invention.

Further, as described above, in the present embodiment, air is supplied into the milk flow path L3 from a predetermined portion of the milk flow path L3 between the first pump 7 and the milk tank 3, and the first pump 7 is driven, whereby cold milk and air are mixed with each other into a mixed beverage that can be delivered and supplied from the beverage delivery port 10. More specifically, in the present embodiment, the air drawn in by the third pump 9 is supplied to the milk flow path L3 via the air flow path L6, the connection portion Z6, the water flow path L5, and the connection portion Z1, and is appropriately mixed with the milk in the milk flow path L3 before being caused to flow through the milk flow path L3, whereby it is possible to produce the mixed beverage.

[Air Ratio in the Mixed Beverage and Viscosity of the Mixed Beverage]

Figure 4:
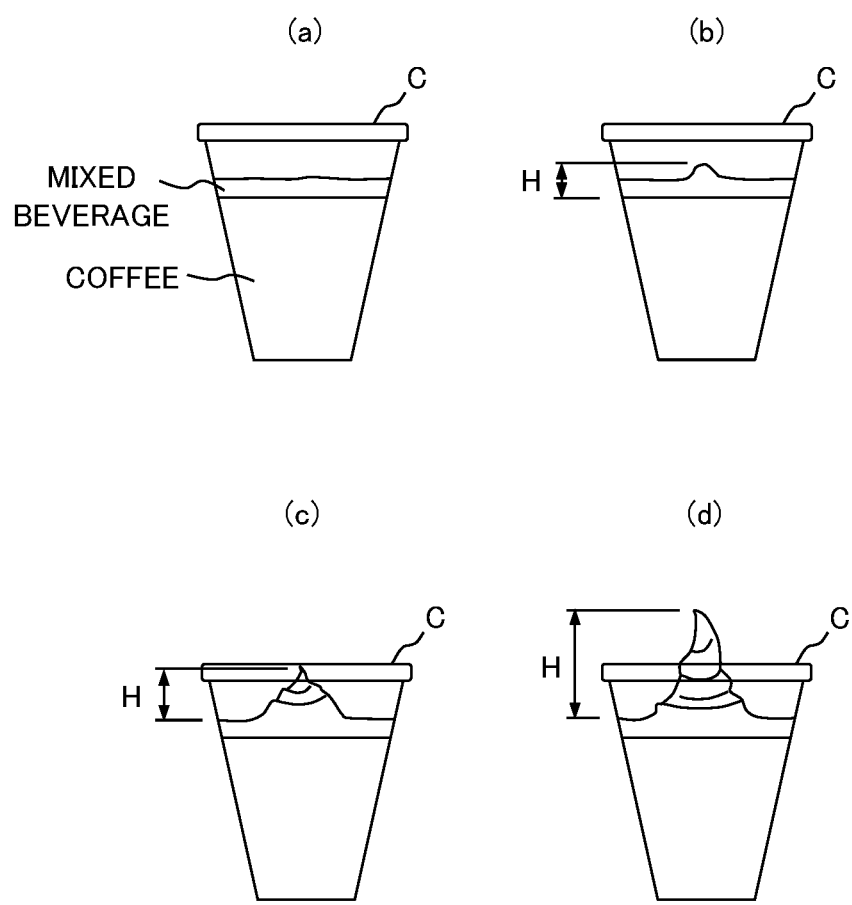
FIG. 4 is a conceptual drawing for illustrating the condition of a mixed beverage supplied by the beverage supply apparatus.

FIG. 4 is a conceptual drawing for illustrating the condition of the mixed beverage supplied by the beverage supply apparatus 100. FIGS. 4(a) through 4(d) respectively illustrate the condition of the mixed beverage when the flow rate of milk is fixed and when the ratio of air mixed with this milk is varied. The air ratio is increased gradually in the order: FIG. 4(a), FIG. 4(b), FIG. 4(c), and FIG. 4(d).

As can be seen, in the condition of FIG. 4(a), the mixed beverage expands substantially flatly so as to cover the surface layer of the coffee in the cup C, and is loose, and exhibits scarcely any viscosity. As can be seen, in FIG. 4(b), the mixed beverage covers the surface layer of the coffee, and the central portion thereof is somewhat swollen and exhibits viscosity. As can be seen, as the condition progresses from FIG. 4(b) to FIG. 4(d), the swelling height (edge height) H of the central portion of the mixed beverage increases, with the viscosity increasing. That is, as the flow rate of air to be mixed with the milk is increased and as the air ratio in the mixed beverage is increased, the viscosity of the mixed beverage increases, with the result that the swelling height H of the mixed beverage in external view increases. Thus, to a predetermined swelling height H of mixed beverage in accordance with the desire and taste of the user or the like to the surface layer of the coffee, it is necessary to produce a mixed beverage of a predetermined viscosity corresponding to the swelling height H. To produce a mixed beverage of a predetermined viscosity, it is necessary to mix a ratio (flow rate) of air corresponding to the viscosity with the milk with satisfactory reproducibility. That is, the greater the amount of air (air flow rate F) mixed with the milk, the higher the viscosity of the mixed beverage and the greater the swelling height H. To produce a mixed beverage of a predetermined viscosity (a predetermined swelling height H), it is necessary to accurately set the amount of air (air flow rate F) mixed with the milk.

[Relationship Between the Valve Opening Degree of the First Flow Rate Adjustment Valve and the Air Flow Rate]

In the present embodiment, the control unit 1 is configured to execute an air purge operation (more specifically, a drain process and air purge process) in which air is caused to flow through the milk flow path L3, etc. after the execution of a beverage delivery process described below and after completion of the supply of the mixed beverage. The air for the air purge and the air for the production of the mixed beverage are supplied by the single third pump 9.

Here, the air purge operation is executed for the purpose of blowing away water, etc. in the piping by driving the third pump 9 and the first pump 7 to vigorously circulate air throughout the piping such as the milk flow path L3. Thus, the air amount (flow rate) and the delivery pressure required for the air purge are larger (higher) than the air amount (flow rate) and delivery pressure required for the production of the mixed beverage. Thus, in the case in which, as in the present embodiment, the air for air purge and the air for producing mixed beverage are supplied by the single third pump 9, the delivery flow rate and delivery pressure of the third pump 9 are excessive for the mixed beverage supply operation (the beverage delivery process described below by supply instruction S2 or S4). As a result, for example, at the time of mixed beverage supply operation, even if the air of excessive delivery flow rate and delivery pressure delivered from the third pump 9 is guided as it is to the first flow rate adjustment valve V7 to adjust the valve opening degree G of the first flow rate adjustment valve V7, there are cases in which, for the reason described below, it is difficult or impossible to set the air flow rate F to a predetermined target air flow rate Fc corresponding to a predetermined viscosity (a predetermined swelling height H).

Figure 5:
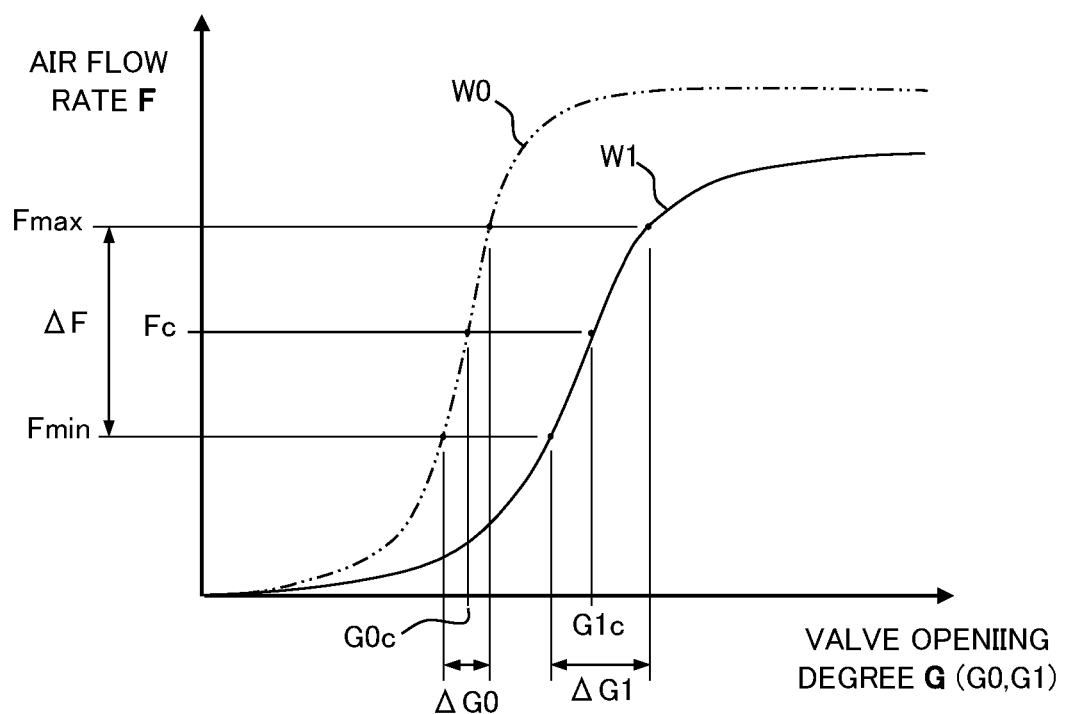
FIG. 5 is a conceptual drawing for illustrating the relationship between the valve opening degree of a first flow rate adjustment valve of the beverage supply apparatus.

FIG. 5 is a conceptual drawing for illustrating the relationship between the valve opening degree G (G0, G1) of the first flow rate adjustment valve V7 adopted in the present embodiment and the air flow rate F of the air adjusted by the first flow rate adjustment valve V7 and flowing through the air flow path L6 on the downstream side of the first flow rate valve V7. The abscissa indicates the valve opening degree G (G0, G1) of the first flow rate adjustment valve V7, and the ordinate indicates the air flow rate F of the air adjusted by the first flow rate adjustment valve V7. In the drawing, the curve W0 indicated by the dash-double-dot line indicates the relationship between the valve opening degree G0 and the air flow rate F in the case in which the air of excessive delivery flow rate and delivery pressure delivered from the third pump 9 is guided as it is to the first flow rate adjustment valve V7 (that is, in the case in which there is no release path L7). In the drawing, the curve W1 indicated by the solid line indicates the relationship between the valve opening degree G1 and the air flow rate F in the case in which the sixth opening/closing valve V9 is open and in which a portion of the air delivered from the third pump 9 is released to the outside via the release path L7 (that is, in the case of the present embodiment, in which the release path L7 is provided).

As illustrated in FIG. 5, the increase gradient of the air flow rate F with respect to the change amount of the valve opening degree G0 in the case of the curve W0 (the conventional case) (e.g., $\Delta F/\Delta G0$) is greater than the increase gradient of the air flow rate F with respect to the change amount of the valve opening degree G1 in the case of the curve W1 (the present embodiment) (e.g., $\Delta F/\Delta G1$), and is steeper. That is, in the conventional case in which the increase gradient is steep, the sensitivity of the change in the control object (air flow rate F) with respect to the change in the valve opening degree G0 is too high, so that the air flow rate F undergoes a great change when the valve opening degree G0 is changed just a little. As a result, when the valve opening degree G is deviated to a small degree from the valve opening degree G0c corresponding to the target air flow rate Fc, the air flow rate F is greatly deviated from the target air flow rate Fc, and, in some cases, it is difficult or impossible to accurately set the air flow rate F to the target air flow rate Fc or in the vicinity thereof. Further, the flow rate adjustment range $\Delta F$ (upper limit air flow rate Fmax, lower limit air flow rate Fmin) of the flow rate F corresponding to the viscosity range of the mixed beverage in accordance with the desire and taste of the user or the like is previously supposed. Thus, in the conventional case in which the increase gradient is steep, the adjustment range $\Delta G0$ for the valve opening degree G corresponding to the flow rate adjustment range $\Delta F$ is a relatively small range. As a result, it is difficult or impossible to adjust the valve opening degree G0 within this small adjustment range $\Delta G0$ and to supply a mixed beverage of a viscosity in accordance with the desire and taste of the user or the like.

In contrast, in the case of the present embodiment, a portion of the air of excessive delivery flow rate and delivery pressure delivered from the third pump 9 is released to the outside via the release path L7, and the flow rate of the air heading for the first flow rate adjustment valve V7 is reduced as compared with the prior art. As a result, as illustrated in FIG. 5, the increase gradient of the curve W1 can be made gentler as compared with the conventional case, making it possible to lower the sensitivity to a change in the air flow rate F with respect to the change in the valve opening degree G1 as compared with the prior art. Thus, even if the valve opening degree G is deviated a little from the valve opening degree G1c corresponding to the target air flow rate Fc, the air flow rate F is situated in the vicinity of the target air flow rate Fc, and further, by performing fine adjustment on the valve opening degree G, the air flow rate F can be accurately set to the target air flow rate Fc. Further, in the case of the present embodiment, the adjustment range $\Delta G1$ for the valve opening degree G corresponding to the flow rate degree adjustment range $\Delta F$ can be enlarged, and by adjusting the valve opening degree G1 within this large adjustment range $\Delta G1$, it is possible to supply a mixed beverage of a viscosity in accordance with the desire and taste of the user or the like easily and properly.

More specifically, in the present embodiment, during the mixed beverage supply operation (in the case of the beverage delivery process described below by the supply instruction S2 or S4), the sixth opening/closing valve V9 is open, and during the air purge operation for causing air to flow through the milk flow path L3 after the completion of the supply of the milk or the mixed beverage (more specifically, after the completion of the beverage delivery process described below by the supply instructions S1 through S4), it is fully closed. During the mixed beverage supply operation, the first flow rate adjustment valve V7 adjusts the valve opening degree G1 based on the input signal from the control unit 1 so as to supply a predetermined flow rate of air (target air flow rate Fc) to the milk flow path L3, etc., and during the air purge operation, it is fully closed.

In the present embodiment described below by way of example, the valve opening degree G1 during the mixed beverage supply operation is set to a predetermined value corresponding to the viscosity of the mixed beverage in accordance with the desire of the user of the beverage supply apparatus 100. This, however, should not be construed restrictively. There may be provided a viscosity selection button for the user or the like to select the viscosity of the mixed beverage, making it possible for the valve opening degree G1 of the first flow rate adjustment valve V7 to be controlled by the control unit 1 in accordance with the viscosity selected by the user or the like.

[Operation of the Beverage Supply Apparatus]

Next, the operation of the beverage supply apparatus 100 according to the present embodiment will be described with reference to the drawings. It is to be assumed that in the initial state, at least the piping of a predetermined length including the heating pipe L31 and the delivery pipe L32 of the milk flow path L3 (for example, the region of the milk flow path L3 between the connection portion Z1 and the second switching valve V4), the water flow path L5, and the drain pipe L4 are filled with water. Further, it is to be assumed that in the initial state, the opening/closing valves (V1, V2, V5, V6, V8, and V9) and the first flow rate adjustment valve V7 are in the closed state, that the first switching valve V3 is open to the bypass pipe L34 side, and that the second switching valve V4 is open to the drain pipe L4 side. Thus, the control unit 1 executes an initial operation in which water is passed via the connection portion Z1, the first switching valve V3, the bypass pipe L34, and the drain pipe L4 and in which, after this, the first switching valve V3 is operated to pass water via the inflow pipe L30, the heating pipe L31, the delivery pipe L32, and the drain pipe L4, thereby filling the piping of the predetermined length (the region between the connection portion Z1 and the second switching valve V4, more specifically, the portion between the connection portion Z1 and the first switching valve V3, the inflow pipe L30, the heating pipe L31, the delivery pipe L32, and the bypass pipe L34), the water flow path L5, and the drain pipe L4 with water. In the following, for simplification of the illustration, the names of the valves (V1 through V9) will be omitted, and the valves will be indicated solely by the reference numerals (V1 through V9).

The control unit 1 mainly controls the beverage supply operation for supplying milk or mixed beverage in the apparatus main body portion 2, and the water filling operation for filling the milk flow path L3 with water. First, in the initial state, the region of the milk flow path L3 between the connection portion Z1 and V4, the water flow path L5, and the drain pipe L4 are filled with water. In this state, V4 is open to the drain pipe L4 side, whereas the valves (V2, V5, V6, and V7) on the upstream side of the piping filled with water are closed and, at the same time, the third check valve C3 and the fourth check valve C4 are provided in the water flow path L5 as appropriate, so that discharge from the drain pipe L4 of the water filling the milk flow path L3, etc. in the initial state is prevented or suppressed.

[Beverage Supply Basic Operation (Drain Process)]

The control unit 1 controls the operation of the apparatus main body portion 2 (the cooling storage 4, the heating device 6, the pumps 7 and 8, and the valves V1 through V9) such that, based on the supply instruction (S1 through S4) from the coffee server 50, one of hot milk, hot mixed beverage, cold milk, and cold mixed beverage is delivered from the beverage delivery port 10 to be supplied into the cup C.

More specifically, for example, when the supply instruction (S3 or S4) for cold milk or cold mixed beverage is input from the coffee server 50 to the control unit 1, the control unit 1 first opens V5 and V8 and, at the same time, drives (starts) the first pump 7 and the third pump 9. As a result, the large amount of air delivered from the third pump 9 is supplied to the milk flow path L3 via the branching portion Z7, V8, the connection portion Z2, V5, the connection portion Z6, and the connection portion Z1. As a result, due to this air thus supplied, mainly the water between the connection portion Z2 and the connection portion Z1 of the water flow path L5 and the water in the milk flow path L3 is forced out, and is drained as waste water to the outside (a drain tank or a drain port) via the bypass pipe L34 and the drain pipe L4. In this case, the water in the inflow pipe L30, the heating pipe L31, and the piping of the delivery pipe L32 between the outlet side end portion L31a and the connection portion Z9 remains as it is. In this state, there is completed the drain process in the beverage supply basic operation in the case in which the supply instruction S3 or S4 is input.

On the other hand, when the supply instruction (S1 or S2) for hot milk or hot mixed beverage is input to the control unit 1, the control unit 1 first opens V5 and V8, and operates V3 to switch the flow route of the milk flow path L3 to the one via the heating pipe L31. At the same time, it drives the first pump 7 and the third pump 9. As a result, due to the air supplied to the milk flow path L3, mainly the water between the connection portion Z2 and the connection portion Z1 of the water flow path L5 and the water in the milk flow path L3 is forced out, and is drained as waste water to the outside via the inflow pipe L30, the heating pipe L31, the delivery pipe L32, and the drain pipe L4. In this case, the water in the bypass pipe L34 remains as it is. In this state, there is completed the drain process in the beverage supply basic operation in the case in which the supply instruction S1 or S2 is input.

That is, in the present embodiment, the control unit 1 executes the drain process in the beverage supply basic operation solely with respect to the piping through which beverage (milk or mixed beverage) flows. In other words, the control unit 1 selects the piping line where the drain process of the beverage supply basic operation is executed in accordance with the difference between the kind of beverage, the hot beverage (supply instruction S1 or S2) and the cold beverage (supply instruction S3 or S4).

Instead of V5, V6 and V8 may be opened before or after this drain process (air purge process), thereby draining also the water in the bypass pipe L51 via the drain pipe L4. When a predetermined period of time has elapsed after the opening of V8, V5, or V6, the control unit 1 closes V8, V5, or V6, and, at the same time, stops the first pump 7 and the third pump 9 to thereby complete the drain process.

[Beverage Supply Basic Operation (Beverage Delivery Process)]

Next, the control unit 1 opens V2, and operates V4 to switch the connection destination of the delivery pipe L3 to the outlet pipe L33. After this, it drives the first pump 7. In accordance with the input supply instruction (S1 through S4), the control unit 1 determines whether or not to switch the flow route of the milk flow path L3 to that via the heating pipe L31, and whether or not to supply air to the milk flow path L3. Further, in the case in which the supply instruction (S2 or S4) for supplying mixed beverage is input, the control unit 1 opens V9, and at the same time, performs control such that the valve opening degree G1 coincides with the valve opening degree G1c corresponding to the target air flow rate Fc or is within a predetermined permissible range.

More specifically, in the case in which cold milk is to be supplied (supply instruction S3), the control unit 1 maintains the closed state of V7 without operating V3. As a result, the apparatus main body portion 2 delivers a predetermined amount Q1 of cold milk drawn out of the milk tank 3 from the beverage delivery port 10 and supplies it into the cup C via the bypass pipe L34, the portion of the delivery pipe L32 between the connection portion Z9 and V4, and the outlet pipe L33. In this case, the water in the inflow pipe L30, in the heating pipe L31, and in the piping portion of the delivery pipe L32 between the outlet side end portion L31a and the connection portion Z9 remains as it is.

In the case in which a cold mixed beverage of a predetermined viscosity is to be supplied (supply instruction S4), the control unit 1 opens V9 and drives the third pump 9. In this state, the control unit 1 controls the valve opening degree G1 of V7 such that it coincides with the valve opening degree G1c corresponding to the target air flow rate Fc or is within a predetermined permissible range. As a result, the apparatus main body portion 2 mixes cold milk and air with each other in the milk flow path L3 to produce a predetermined amount Q2 of cold mixed beverage of a predetermined viscosity, and supplies this cold mixed beverage as it is into the cup C from the beverage delivery port 10 via the bypass pipe L34, the portion of the delivery pipe L32 between the connection portion Z9 and V4, and the outlet pipe L33. In this case also, the water in the inflow pipe L30, in the heating pipe L31, and in the piping portion of the delivery pipe L32 between the outlet side end portion L31a and the connection portion Z9 remains as it is.

In the case in which hot milk is to be supplied (supply instruction S1), V3 is operated to switch the flow route of the milk flow path L3 to that via the heating pipe L31. As a result, the apparatus main body portion 2 drives the first pump 7 to cause cold milk drawn out of the milk tank 3 to flow through the inflow pipe L30, the heating pipe L31 heated by the heating device 6, and the delivery pipe L32, thereby delivering a predetermined amount Q1 of hot milk from the beverage delivery port 10 and supplying it into the cup C. In this case, the water in the bypass pipe L34 remains as it is.

In the case in which a hot mixed beverage of a predetermined viscosity is to be supplied (supply instruction S2), the control unit 1 operates V3, and switches the flow route of the milk flow path L3 to that via the heating pipe L31, opens V9, and drives the third pump 9. In this state, the control unit 1 controls the valve opening degree G1 of V7 such that it coincides with the valve opening degree G1c corresponding to the target air flow rate Fc or is within a predetermined permissible range. As a result, the apparatus main body portion 2 causes cold mixed beverage produced by mixing cold milk with air in the milk flow path L3 to flow via the heating pipe L3, thereby supplying a predetermined amount Q2 of hot mixed beverage of a predetermined viscosity from the beverage delivery port 10 into the cup C. In this case also, the water in the bypass pipe L34 remains as it is.

Here, the milk delivery capacity (suction capacity) Qm by the first pump 7 is monitored by the control unit 1 based on a pulse signal input to the control unit 1 from the milk flow meter 13. For example, in the case in which a predetermined amount of milk is to be supplied to the cup C (supply instruction S1 or S3), in the present embodiment, for example, when the milk delivery capacity Qm being monitored reaches the predetermined amount Q1, the control unit 1, for example, stops the first pump 7, and closes V2. In this state, solely a capacity of milk obtained by subtracting the volume Qx of the interior of the milk flow path L3 from the predetermined amount Q1 is supplied to the cup C, and the capacity of milk in the cup C has not reached the predetermined amount Q1. Thus, in the case of the supply instruction S1 or S3, after stopping the first pump 7 and closing V2, the control unit 1 opens, for example, V8 and V5 (In the case of the supply instruction S1, V3 is further operated to switch the flow route of the milk flow path L3 to that via the heating pipe L31). At the same time, the third pump 9 and the first pump 7 are driven to force out by air the milk remaining in the milk flow path L3, whereby the predetermined amount Q1 of milk is supplied to the cup C.

Further, for example, in the case in which a predetermined amount Q2 of mixed beverage is to be supplied to the cup C (the supply instruction S2 or S4), in the present embodiment, when the delivery capacity Qm of milk being monitored reaches a predetermined amount Qc corresponding to the predetermined amount Q2 of the predetermined mixed beverage, the control unit 1, for example, stops the first pump 7 and closes V2. In this state, solely a volume (Q2−Qx) of mixed beverage obtained by subtracting the volume Qx of the interior of the milk flow path L3 from the predetermined amount Q2 is being supplied to the cup C, and the volume of mixed beverage in the cup C has not reached the predetermined amount Q2. Thus, in the case of the supply instruction S2 or S4, after stopping the first pump 7 and closing V2, the control unit 1, for example, opens V8 and V5 (In the case of the supply instruction S2, V3 is further operated to switch the flow route of the milk flow path L3 to that via the heating pipe L31). At the same time, the third pump 9 and the first pump 7 are driven to force out the mixed beverage and milk remaining in the milk flow path L3 by air, whereby the predetermined amount Q2 of mixed beverage is supplied to the cup C.

When a predetermined period of time has elapsed after the opening of V8, V5, V9, and V7, the control unit 1 closes V8, V5, V9, and V7, and returns the connection destination of the delivery pipe L32 by V4 to the drain pipe L4 side. Further, it stops the first pump 7 and the third pump 9, whereby the beverage delivery process is completed. Then, the control unit 1 advances to the water filling operation.

[Basic Operation of the Water Filling Operation (Water Filling Process)]

In the case in which the supply of the predetermined amount Q1 of milk or the predetermined amount Q2 of mixed beverage has been completed, as in the initial state, the control unit 1 controls the operation of the valves V1 through V9 and the pumps 7 through 9 such that at least the piping of a predetermined length of the milk flow path L3 including the heating pipe L31 and the delivery pipe L32 (for example, the region of the milk flow path L3 between the connection portion Z1 and V4), the water flow path L5, and the drain pipe L4 are filled with water.

More specifically, when the beverage delivery process has been completed, the control unit 1, for example, opens V5, and drives the first pump 7 and the second pump 8. As a result, the water supplied by the second pump 8 is supplied from a predetermined portion of the milk flow path L3 between the first pump 7 and the milk tank 3 (the connection portion Z1 in the present embodiment) into the milk flow path L3 via the water flow path L5. When a predetermined period of time has elapsed after the driving of the first pump 7 and the second pump 8, the control unit 1 stops the first pump 7 and the second pump 8, and closes V5. As a result, as in the initial state, in the beverage supply apparatus 100, the region of the milk flow path L3 between the connection portion Z1 and V4, the water flow path L5, and the drain pipe L4 are filled with water, and the apparatus is placed in the standby state.

More specifically, when the beverage delivery process by the supply instruction S1 or S2 has been completed, some water remains in the bypass pipe L34. Thus, of the piping of the predetermined length, the portion between the connection portion Z1 and V3, the inflow path L30, the heating pipe L31, and the delivery pipe L32 are filled with water, whereby, as in the initial state, a state is attained in which the piping of the predetermined length is filled with water. As a result, the water filling process after the completion of the beverage delivery process by the supply instruction S1 or S2 is completed. When the beverage delivery process by the supply instruction S3 or S4 has been completed, some water remains in the inflow pipe L30, the heating pipe L31, and the piping portion of the delivery pipe L32 between the outlet side end portion L31a and the connection portion Z9. Thus, by filling the bypass pipe L34 with water, there is attained a state in which, as in the initial state, the piping of the predetermined length is filled with water. As a result, the water filling process after the completion of the beverage delivery process by the supply instruction S3 or S4 is completed. That is, in the present embodiment, of the milk flow path L3, solely the piping line through which milk or mixed beverage has flowed is filled with water.

In the state in which air has been supplied into the milk flow path L3 by the beverage delivery process to force milk or mixed beverage out of the milk flow path L3, there are cases in which the milk or mixed beverage has not been completely removed from the milk flow path L3. Thus, when, in this state, the basic operation of the water filling operation (the water filling process) is executed to fill the milk flow path L3 with water, there is, strictly speaking, the possibility of the milk flow path L3 being filled with a diluted aqueous solution of milk. Here, the heating pipe L31 is heated to high temperature by the heating device 6, so that even if various germs (microorganisms) have been mixed in the diluted aqueous solution of milk, there is no fear of the microorganisms or the like will multiply in the heating pipe L31 at high temperature. On the other hand, in the standby state of the beverage supply apparatus 100, in particular, of the delivery pipe S32, the portion of the diluted aqueous solution of milk in the piping portion far from the outlet side end portion L31a of the heating pipe L31 can be at a temperature at which various germs such as microorganisms can easily multiply on protein or the like (for example, approximately 30° C.). Further, while the temperature in the bypass pipe L34 in the standby state after the completion of the beverage delivery process by the supply instruction S3 or S4, and the temperature in the piping portion of the inflow pipe L30 in the standby state after the completion of the beverage delivery process by the supply instruction S1 or S2 far from the inlet side end portion L31b of the heating pipe L31 are lower than the temperature in the delivery pipe L32, they can be temperatures at which various germs (microorganisms) can multiply.

[Water Re-Filling Operation in the Standby State]

In the following, to be described will be the structure for preventing multiplication of the above-mentioned various germs in the inflow pipe L30, the delivery pipe L32, and the bypass pipe L34 in the standby state after the completion of the beverage delivery process. In the present embodiment, in the case in which the standby state has continued for a predetermined period of time, the water in the piping of the predetermined length is drained via the drain pipe L4, and then there is executed a water re-filling operation in which the piping of the predetermined length is newly filled with water.

More specifically, by the control unit 1, the piping of the predetermined length of the milk flow path L3 including at least the heating pipe L31 and the delivery pipe L32 (for example, the region of the milk flow path L3 between the connection portion Z1 and V4, more specifically, the region between the connection portion Z1 and V3, the inflow pipe L30, the heating pipe L31, the delivery pipe L32, and the bypass pipe L34), the water flow path L5, and the drain pipe L4 are filled with water, and in the case in which the standby state has continued for a predetermined period of time with none of the supply instructions (S1 through S4) being input, the drain process is first executed. The drain process in this water re-filling operation (the air purge process, the air purge operation) is executed, for example, on the piping of the predetermined length, the water flow path L5, and the drain pipe L4, whereby the water filling the piping is discharged. When this drain process is completed, the control unit 1 executes the water re-filling process. The water filling process of this water re-filling operation is executed on the piping on which the drain process has been executed, thereby filling the entire piping with new water. As a result, the piping of the predetermined length including at least the heating pipe L31 and the delivery pipe L32 of the milk flow path L3, the water flow path L5, and the drain pipe L4 are newly filled with water. Then, the water re-filling operation by the control unit 1 is completed.

After the completion of the beverage delivery process by the supply instruction S1 or S2, the water re-filling operation is executed on the interior of the region between the connection portion Z1 and V3, the inflow pipe L30, the heating pipe L31, the delivery pipe L32, the water flow path L5, and the drain pipe L4. After the completion of the beverage delivery process by the supply instruction S3 or S4, the water re-filling operation may be executed on the region between the connection portion Z1 and V3, the bypass pipe L34, the region of the delivery pipe L32 between the connection portion Z9 and V4, the water flow path L5, and the drain pipe L4. In this case, distinction is made in the measurement of the continuation time of the standby state between the continuation time of the standby state in which the supply instruction S1 or S2 is not input and the continuation time of the standby state in which the supply instruction S3 or S4 is not input, and the water re-filling operation is executed separately.

Further, in the case in which distinction is thus made in the measurement of the continuation time of the standby state between the case of hot beverage (supply instruction S1 or S2) and the case of cold beverage (supply instruction S3 or S4) and in which the water re-filling operation is separately executed, the threshold value (the predetermined time) of the continuation time of the standby state for executing the re-filling operation is set, for example, such that the threshold value in the case of hot beverage is smaller (shorter) than the threshold value in the case of cold beverage. More specifically, in the standby state, the temperature of the water in the piping for hot beverage is higher than the temperature of the water in the piping for cold beverage, so that the probability of various germs (microorganisms) multiplying in the piping for hot beverage is higher than the probability of various germs (microorganisms) multiplying in the piping for cold beverage. Thus, the threshold value for hot beverage should be made shorter than the threshold value for cold beverage. As a result, it is possible to reduce the number of times that the water filling operation is performed with respect to the piping for cold beverage to a minimum requisite level, making it possible to reduce the amount of waste water.

[Rinsing Process]

In the present embodiment, the control unit 1 executes the process of rinsing the interior of the milk flow path L3 prior to the water filling process.

More specifically, in the case in which the supply of the predetermined amount of milk or mixed beverage has been completed, the control unit 1 executes a rinsing process in which water is caused to flow through the milk flow path L3 for a predetermined period of time from a predetermined portion of the milk flow path L3 between the first pump 7 and the milk tank 3 to rinse the interior of the milk flow path L3, and in which the post-rinsing water is discharged via the drain pipe L4, and then executes the water filling process in which the piping of the predetermined length is filled with water.

More specifically, when the beverage delivery process is completed, the control unit 1, for example, opens V5 and operates V3 as appropriate, and drives the first pump 7 and the second pump 8. As a result, the water supplied by the second pump 8 is supplied to the milk flow path L3 from a predetermined portion of the milk flow path L3 between the first pump 7 and the milk tank 3 (the connection portion Z1 in the present embodiment). As a result, the water in the water flow path L5, the water in the region of the milk flow path L3 between the connection portion Z1 and V4, and the water in the drain pipe L4 are forced out by the water supplied from the second pump 8, and is drained via the drain pipe L4. More specifically, the rinsing of the piping of the milk flow path L3 between V3 and V4 is executed solely on the piping through which milk or mixed beverage has been passed by the beverage delivery process. That is, after the supply instruction S3 or S4, water is caused to flow via the bypass pipe L34, and, after the supply instruction S1 or S2, water is caused to flow via the heating pipe L31. For example, the control unit 1 drives the first pump 7 and the second pump 8 during a predetermined period of time set so as to allow the water flow path L5, the region of the milk flow path L3 between the connection portion Z1 and V4, and the drain pipe L4 to be sufficiently rinsed and cleansed, and after the predetermined period of time has elapsed, stops the first pump 7 and the second pump 8 and closes V5. In this way, the control unit 1 executes the rinsing process for rinsing and cleansing the piping prior to the water filling process. As a result, it is possible to prevent or suppress remaining of milk or mixed beverage in the piping of the predetermined length, so that it is possible to more reliably prevent or suppress multiplication of various germs in the milk flow path L3.

While in the above example the control unit 1 performs control in the rinsing process such that water is caused to flow through the milk flow path L3 for a predetermined period of time, this should not be construed restrictively. Control may be performed in the rinsing process such that a predetermined amount of water is caused to flow through the milk flow path L3. In this case, the control unit 1 controls the operation of the first pump 7, the second pump 8, and V5 based on a pulse signal from the water flow meter 16.

In the beverage supply apparatus 100 of the present embodiment, in the case in which the single third pump 9 serves both as the pump supplying the air for producing the mixed beverage and as the pump supplying the air for air purge, a portion of the air flowing through the air flow path L6 can be released to the outside by the release path L7. More specifically, during the mixed beverage supply operation, the sixth opening/closing valve V9 provided in the release path L7 is open to release a portion of the air delivered from the third pump 9 to the outside via the release path L7, and during the air purge operation, this sixth opening/closing valve V9 is fully closed to effectively utilize the air delivered from the third pump 9 for air purge.

As a result, even in the case in which the air for producing the mixed beverage and the air for air purge are supplied by the single third pump 9, during the mixed beverage supply operation, a portion of the air delivered from the third pump 9 is released via the release path L7, and the remaining air can be supplied to the milk flow path L3 via the air flow path L6 on the downstream side of the release point Z8. Thus, for example, solely by appropriately setting the flow path sectional area of the release path L7 in accordance with the delivery flow rate of the third pump 9 exhibiting an excessive performance with respect to mixed beverage production, it is possible to accurately supply air at the target flow rate Fc corresponding to a predetermined viscosity to the milk flow path L3. As a result, even in the case in which the air for mixed beverage production and the air for air purge are supplied by the single third pump 9 and in which the third pump 9 of an excessive performance is adopted with respect to the mixed beverage production, the beverage supply apparatus 100 can produce a mixed beverage of a predetermined viscosity with satisfactory reproducibility.

Further, in the present embodiment, the beverage supply apparatus 100 further includes a first flow rate adjustment valve V7 which is provided in the flow path that is a part of the air flow path L6 and extends between the milk flow path side end portion and the release point Z8. The first flow rate adjustment valve V7 adjusts the air flow rate F of the air flowing through this flow path. As a result, it is possible to more appropriately supply a mixed beverage of a viscosity in accordance with the desire and taste of the user or the like.

Further, in the present embodiment, the sixth opening/closing valve V9 is open during the mixed beverage supply operation, and is fully closed during the air purge operation, and during the mixed beverage supply operation, the first flow rate adjustment valve V7 adjusts the valve opening degree G1 based on an input signal from the control unit 1 so as to supply a predetermined flow rate of air to the milk flow path L3, etc., and during the air purge operation, is fully closed.

As a result, during the mixed beverage supply operation, a portion of the air delivered from the third pump 9 is released to the outside via the release path L7, and the flow rate of the air heading for the first flow rate adjustment valve V7 is reduced as compared with the prior art, making it possible to adjust the air flow rate F accurately. During the air purge operation, the sixth opening/closing valve V9 and the first flow rate adjustment valve V7 are fully closed, whereby it is possible to effectively utilize a large amount of air delivered from the third pump 9. Since the air for air purge and the air for mixed beverage production can be supplied by the single third pump 9, it is possible to suppress an increase in cost and an increase in apparatus size.

Further, in the present embodiment, in the case in which the standby state has continued for a predetermined period of time, the water in the piping of the predetermined length of the milk flow path L3 including at least the heating pipe L31 heated by the heating device 6 and the delivery pipe L32 is drained via the drain pipe L4, and then the piping of the predetermined length is newly filled with water. As a result, in the standby state after the completion of the beverage delivery process, even in the case in which the temperature in the delivery pipe L32 attains a temperature at which various germs (microorganisms) easily multiply, it is possible to replace the water in the piping of the predetermined length including the delivery pipe L32 after the completion of the beverage delivery process for each appropriate period of time, so that in the standby state, while preventing deposition and solidification of the protein ingredient of the milk, it is possible to prevent multiplication of various germs in the heating pipe L31 and the delivery pipe L32 in the standby state after the completion of the beverage delivery process. In this way, it is possible to provide a beverage supply apparatus 100 which helps to achieve a further improvement in terms of sanitary safety and which can supply a high quality beverage. Further, in the present embodiment, in the standby state after the completion of the beverage delivery process, it is possible to replace the water also with respect to the bypass pipe L34 by the water re-filling process. Thus, in the standby state after the completion of the beverage delivery process, it is also possible to prevent multiplication of various germs in the bypass pipe L34.

When the standby state continues for a long period of time, the water caused to fill the piping by the water filling process is gradually discharged (leaked) from the drain pipe L4, and there is the possibility of an air layer (accumulated air) being generated in the upper region of the heating pipe L31. In this respect, in the beverage supply apparatus 100 of the present embodiment, water is automatically re-filled at a predetermined point in time before the generation of the air layer in the upper region of the heating pipe L31 due to the continuation for a long period of time of the standby state, whereby it is possible to more reliably prevent deposition and solidification of the milk ingredient due to the generation of the air layer.

In the present embodiment, in both the state in which the supply instruction (S1 through S4) for milk or mixed beverage is input and the standby state in which the supply instruction (S1 through S4) is not input to the control unit 1, the heating device 6 heats the heating pipe L31 so as to maintain a predetermined heating set temperature. As a result, it is possible to more effectively prevent or suppress multiplication of various germs in the standby state, and at the same time, when the supply instruction (S1 or S2) for hot milk or mixed beverage is input, it is possible to quickly supply hot milk or mixed beverage without having to wait for an increase in the temperature of the heating pipe L31.

While in the present embodiment the sixth opening/closing valve V9 provided in the release path L7 is a simple opening/closing valve, this should not be construed restrictively. It may also be a flow rate adjustment valve having a flow rate adjustment function for adjusting the flow rate of the air flowing through the release path L7. In this case, the valve opening degree G of the first flow rate adjustment valve V7 and that of the sixth opening/closing valve V9 having a flow rate adjustment function are respectively adjusted, making it possible to accurately supply the target air flow rate Fc of air to the milk flow path L3.

Next, a beverage supply apparatus according to the second embodiment of the present invention will be described.

Figure 6:
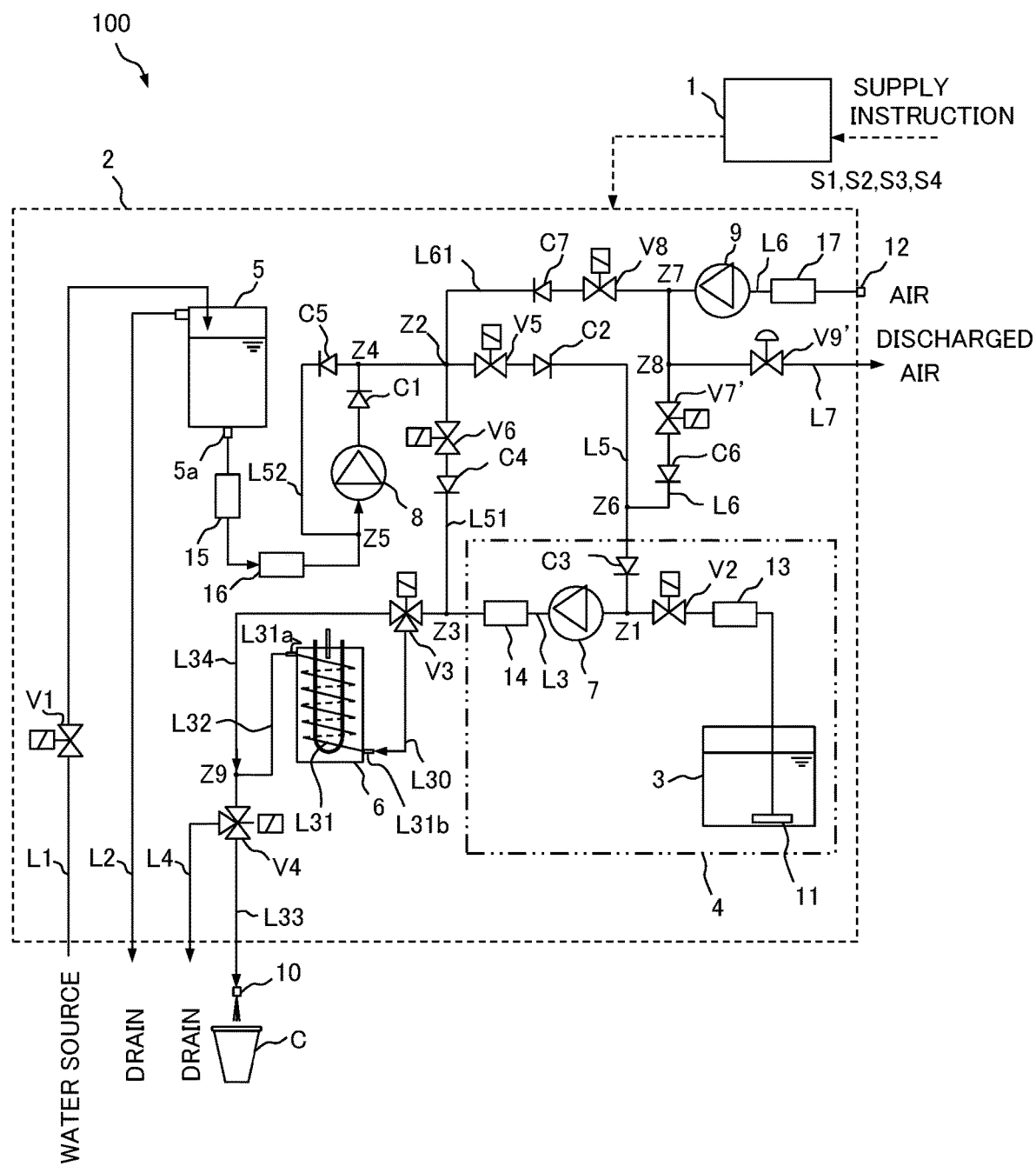
FIG. 6 is a block diagram schematically illustrating the structure of a beverage supply apparatus according to a second embodiment of the present invention.

FIG. 6 is a block diagram for schematically illustrating the structure of the beverage supply apparatus 100 of the second embodiment of the present invention. The components that are the same as those of the first embodiment are indicated by the same reference numerals, and a description thereof will be left out. The following description will center on the differences.

In the second embodiment, instead of the sixth opening/closing valve V9 of the first embodiment, there is provided a second flow rate adjustment valve V9'. At the same time, instead of the first flow rate adjustment valve V7 of the first embodiment, there is provided an air flow path opening/closing valve V7'. Otherwise, this embodiment is of the same structure as the first embodiment.

The second flow rate adjustment valve V9' is provided in the release path L7 and serves to adjust the flow rate of the air discharged via the release path L7. For example, it is a control valve that can continuously adjust the valve opening degree based on a predetermined input signal. In the present embodiment, based, for example, on an input signal from the control unit 1, the second flow rate adjustment valve V9' continuously adjusts the valve opening degree from the fully closed state to the fully open state, making it possible to adjust the discharge flow rate of the air discharged via the release path L7. By appropriately adjusting the valve opening degree of this second flow rate adjustment valve V9', it is possible to adjust the mixing ratio of milk and air in the mixed beverage.

The air flow path opening/closing valve V7' is provided in the flow path that is a part of the air flow path L6 and extends between the milk flow path side end portion (the connection portion Z6) and the release point Z8, and is an opening/closing valve opening and closing this flow path. The air flow path opening/closing valve V7' consists, for example, of an electromagnetic drive type pinch valve that is closed (NC) in the initial state (power source OFF).

More specifically, in the second embodiment, the air flow path opening/closing valve V7' is open during the mixed beverage supply operation, and is fully closed during the air purge operation. During the mixed beverage supply operation, the second flow rate adjustment valve V9' adjusts the valve opening degree based on an input signal from the control unit 1 so as to discharge a predetermined flow rate of air, and, during the air purge operation, is fully closed. The amount of air passed through the second flow rate adjustment valve V9' and discharged during the mixed beverage supply operation is set such that the target flow rate Fc of air is passed through the air flow path opening/closing valve V7' and is supplied to the milk flow path L3, etc. In other words, during the mixed beverage supply operation, the second flow rate adjustment valve V9' adjusts the valve opening degree thereof so as to supply the target flow rate Fc of air to the milk flow path L3, etc.

As a result, during the mixed beverage supply operation, the amount by which a portion of air delivered from the third pump 9 is released to the outside via the release path L7 (discharge air flow rate) is adjusted, whereby the flow rate of air heading for the air flow path opening/closing valve V7' is reduced, and the air flow rate F can be indirectly adjusted. During the air purge operation, the air flow path opening/closing valve V7' and the second flow rate adjustment valve V9' are fully closed, whereby it is possible to effectively use a large flow rate of air delivered from the third pump 9. The air for air purge and the air for mixed beverage production can be supplied by the single third pump 9, so that it is possible to suppress an increase in cost and an increase in apparatus size. Here, the large flow rate of air from the third pump 9 does not flow as it is through the second flow rate adjustment valve V9' but only a portion thereof flows through the same. Thus, as in the case of the first flow rate adjustment valve V7 indicated by the curve W1 of FIG. 5, it is possible to lower the discharge air flow rate change sensitivity with respect to a change in the valve opening degree of the second flow rate adjustment valve V9'. As a result, as in the case of the first flow rate adjustment valve V7, it is possible to accurately set the air flow rate F to the target air flow rate Fc via the second flow rate adjustment valve V9'.

Figure 7:
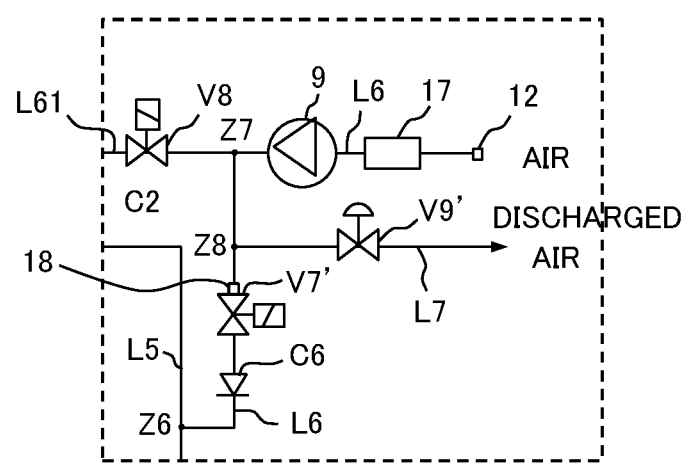
FIG. 7 is a partial piping circuit diagram for illustrating a variation of a beverage supply apparatus according to the second embodiment.

As illustrated in FIG. 7, which is a partial piping circuit diagram for illustrating a variation (variation 1) of the second embodiment, the air flow path opening/closing valve V7' may have a throttle part 18. In this case, during the mixed beverage supply operation, the air flow path opening/closing valve V7' is open and causes a predetermined flow rate of air in accordance with the throttle flow path sectional area of the throttle part 18 to flow through it, and, during the air purge operation, it is fully closed. The throttle part 18 is provided, for example, at the intake port side of the main body of the air flow path opening/closing valve V7', and has a throttle path of a predetermined throttle flow path sectional area.

As a result, through the setting of the throttle flow path sectional area of the throttle part 18, and through the adjustment of the valve opening degree of the second flow rate adjustment valve V9', it is possible to set the air flow rate accurately to the target air flow rate Fc.

Figure 8:
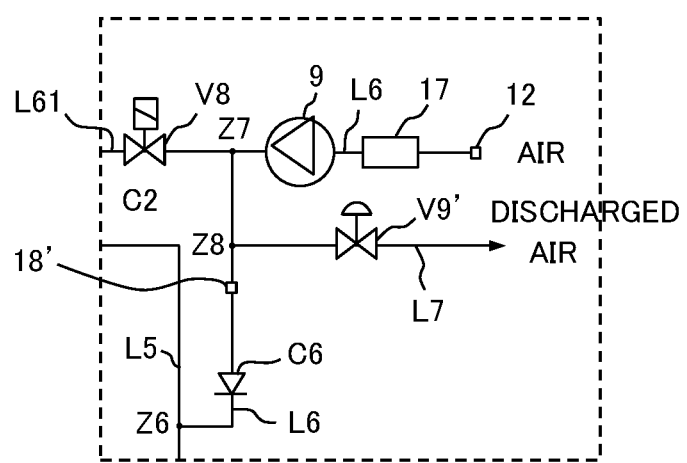
FIG. 8 is a partial piping circuit diagram for illustrating another variation of a beverage supply apparatus according to the second embodiment.

Further, while in the second embodiment the air flow path opening/closing valve V7' is provided instead of the first flow rate adjustment valve V7 of the first embodiment, no air flow path opening/closing valve V7' may be provided as illustrated in FIG. 8. In this case, as illustrated in FIG. 8, simply a throttle part 18' may be provided instead of the first flow rate adjustment valve V7. That is, the throttle part 18' is provided in the flow path that is a part of the air flow path L6 and extends between the milk flow path side end portion (the connection portion Z6) and the release point Z8, and has a throttle path of a predetermined throttle flow path section area. More specifically, during both the mixed beverage supply operation and the air purge operation, the throttle part 18' causes a predetermined air flow rate of air in accordance with the throttle flow rate sectional area to flow through it. During the mixed beverage supply operation, the second flow rate adjustment valve V9' adjusts the valve opening degree based on an input signal from the control unit 1 so as to discharge a predetermined flow rate of air, and, during the air purge operation, it is fully closed.

As a result, it is possible to set the air flow rate F efficiently and accurately to the target air flow rate Fc solely through the setting of the throttle flow path sectional area of the throttle part 18' and through the adjustment of the valve opening degree of the second flow rate adjustment valve V9' without having to provide an opening/closing valve in the air flow path L6. In this case, during the air purge operation, some air is allowed to flow through the throttle part 18'. The amount of the air, however, is minute, so that the major portion of the air delivered from the third pump 9 can be effectively utilized for the air purge of the water flow path L5, etc.

While in the first embodiment and the second embodiment described above the third pump 9 is a delivery flow rate fixed pump which delivers a predetermined flow rate of air, this should not be construed restrictively. It may also be a delivery flow rate variable pump formed so as to be capable of varying the air delivery flow rate based on a predetermined input signal. More specifically, the third pump 9 may be formed such that based, for example, on an input signal from the control unit 1, the pump RPM is changed, whereby its capacity (delivery flow rate, etc.) is variable. As a result, along with the adjustment of the valve opening degree G by the first flow rate adjustment valve V7 and the adjustment of the valve opening degree by the second flow rate adjustment valve V9', it is possible to set the air flow rate F of the air supplied to the milk flow path L3 to the target air flow rate Fc more accurately. The amount of air (flow rate) for mixed beverage production is smaller than the amount of air (flow rate) for air purge, and is of a very small amount, so that during mixed beverage production, it may be sometimes difficult to set the air flow rate F to the target air flow rate Fc by the capacity adjustment of the third pump 9 alone. Thus, even in the case in which a delivery flow rate variable pump is adopted as the third pump 9, it is desirable to provide the first flow rate adjustment valve V7 in the air flow path L6 and to provide the second flow rate adjustment valve V9' in the release path L7.

While in the embodiments the first flow rate adjustment valve V7 adjusts the valve opening degree G based on an input signal from the control unit 1 provided in the beverage supply apparatus, the transmission source of the input signal is not restricted thereto. The transmission source of the input signal may be the control unit in the coffee server 50, or an independent external control device.

While in the embodiments the air purge operation is executed, in the case in which no air purge operation is executed, for example, the sixth opening/closing valve V9, the first flow rate adjustment valve V7, the second flow rate adjustment valve V9', the air flow path opening/closing valve V7', and the bypass pipe L61 may not be provided. In this case, the release path L7 is simply provided in the air flow path L6. As a result, even in a case in which, for example, it is impossible to select a third pump 9 having an appropriate delivery pressure and delivery flow rate performance for mixed beverage production, and there is nothing for it but to adopt a third pump 9 of an excessive performance, it is possible to release a portion of the air delivered from the third pump 9 via the release path L7, and to supply the remaining air to the milk flow path L3 via the air flow path L6 on the downstream side of the release point Z8. Thus, for example, solely by appropriately setting the flow path sectional area of the release path L7 in accordance with the delivery flow rate of the third pump 9 having an excessive performance, it is possible to accurately supply the target air flow rate Fc of air to the milk flow path L3. As a result, even in the case in which there is nothing for it but to adopt a third pump 9 having an excessive performance, the beverage supply apparatus 100 can produce a mixed beverage of a predetermined viscosity with satisfactory reproducibility.

While in the embodiments the air for mixed beverage production is supplied to the milk flow path L3 via a predetermined portion (the connection portion Z1) of the milk flow path L3 on the upstream side of the first pump 7, this should not be construed restrictively. Although not illustrated, a branch air flow path branching off from a predetermined portion (the branching portion Z7) of the air flow path L6 between the third pump 9 and the release point Z8 of the air flow path L6 may be connected to the downstream side of the first pump 7 (for example, a predetermined portion between the first pump 7 and the swollen portion 14), making it possible for the air to be supplied into the milk flow path L3 via one of the air flow path L6 and the branch air flow path.

While in the embodiments the control unit 1 executes the drain process of the basic beverage supply operation solely on the piping through which the beverage (milk or mixed beverage) flows, this should not be construed restrictively. The control unit 1 may perform control such that in the case in which a hot beverage supply instruction (S1 or S2) is input, draining is effected not only on the water in the piping for hot beverage but also on the water in the piping for coil beverage, and that in the case in which a cold beverage supply instruction (S3 or S4) is input, draining is effected not only on the water in the piping for cold beverage but also on the water in the piping for hot beverage. Further, while in the present embodiment the control unit 1 performs re-filling with water through the water-refilling process solely on the piping line of the milk flow path L3 through which milk or mixed beverage has flowed, this should not be construed restrictively. The entire milk flow path L3 may be re-filled with water. For example, after the beverage delivery process by a hot beverage supply instruction (S1 or S2), the empty piping for hot beverage is filled with water, and the water already filling the piping for cold beverage is replaced with fresh water, and, after the beverage delivery process by a cold beverage supply instruction (S3 or S4), the water already filling the piping for hot beverage is replaced with fresh water and the empty piping for cold beverage is filled with water.

Although in the embodiments the control unit 1 executes the water re-filling process to thereby prevent or suppress multiplication of various germs (microorganisms), this should not be construed restrictively. Instead of the water re-filling process, a germ intrusion prevention operation may be executed as in the variation described below.

In the case in which the water re-filling process is not executed, the standby state continues for a long period of time, and there is the possibility of various germs (microorganisms) multiplying in the water in the delivery pipe L32. In this state, even when the supply instruction S1 or S2 is input, and the water in the piping of the predetermined length is discharged from the drain pipe L4 through the drain process via the heating pipe L31 and the delivery pipe L32, there is the possibility of various germs being allowed to remain in the piping. In this case, of the milk or mixed beverage heated by flowing through the heating pipe L31, etc., the first predetermined amount of milk or mixed beverage first passing through the delivery pipe L32 can be subject to intrusion of various germs that remained in the delivery pipe L32. Further, also in the case in which the supply instruction S3 or S4 is input and the drain process is executed, there is the possibility of some germs remaining in the bypass pipe L34, thus involving a similar problem. In view of these problems, the control unit 1 executes a germ intrusion preventing operation described in detail below.

[Germ Intrusion Preventing Operation in the Beverage Delivery Process]

In the present variation, when the supply instruction (S1 through D4) is input in the standby state, the control unit 1 drains the water in the piping of the predetermined length via the drain pipe L4 (the drain process), and, at the same time, executes a germ intrusion preventing operation in which a predetermined amount of milk or mixed beverage is discharged from the drain pipe L4, and then delivers the milk or mixed beverage from the beverage delivery port 10 via the outlet pipe L33. That is, when the supply instruction (S1 through S4) is input in the state in which the piping of the predetermined length is filled with water, the water in the piping of the predetermined length and a first predetermined amount of milk or mixed beverage are discharged from the drain pipe L4, and then the milk or mixed beverage is delivered from the beverage delivery port 10 via the outlet pipe L33.

More specifically, when the supply instruction (S1 through S4) is input in the standby state, the control unit 1 executes the drain process and completes it in accordance with the kind of supply instruction. After this, the control unit 1 starts the beverage delivery process. In the beverage delivery process, the control unit 1 operates V4 after a predetermined period of time has elapsed after the start of the beverage delivery process. That is, the timing with which V4 is operated in the beverage delivery process is delayed. As a result, between the start of the beverage delivery process and the operation of V4, even if various germs multiply in piping such as the delivery pipe L32 in the standby state, the first predetermined amount of milk or mixed beverage that can contain the germs is drained via the drain pipe L4. After this, the control unit 1 operates V4, and supplies milk or mixed beverage into the cup C via the outlet pipe L33.

After a predetermined period of time has elapsed since the start of the beverage delivery process, the control unit 1 operates V4, thereby draining the first predetermined amount of milk or mixed beverage. This, however, should not be construed restrictively. After the start of the beverage delivery process, the first predetermined amount of milk or mixed beverage may be drained by operating V4 with a timing based on the pulse signal from the milk flow meter 13.

In this way, in the beverage supply apparatus 100 according to the present variation, the first predetermined amount of milk or mixed beverage first passing the portion of the delivery pipe L32 between the connection portion Z9 and V4 is drained via the drain pipe L4, and is not delivered from the beverage delivery port 10. Thus, in the beverage supply apparatus 100, even if the standby state continues for a long period of time, and various germs are allowed to multiply in piping such as the delivery pipe L32, it is possible to supply milk or mixed beverage without allowing intrusion of the germs into the milk or mixed beverage. Also in the beverage supply apparatus 100 according to the present variation, at least the piping of the predetermined length is filled with water in the standby state, so that it is possible to prevent deposition and solidification of the beverage ingredients. In this way, it is possible to achieve a further improvement in terms of sanitary safety and to provide a beverage supply apparatus 100 that can supply a high quality beverage. Further, in the beverage supply apparatus 100 according to the present variation, it is possible to prevent a minute amount of water that has not been completely removed from the milk flow path L3 by the drain process is prevented from intruding into the milk or mixed beverage and being supplied into the cup C. As a result, the beverage is not diluted with water, making it possible to supply a higher quality of milk or mixed beverage.

While in the embodiments the internal piping portion of the milk flow path L3 is also the area to be rinsed, this should not be construed restrictively. The area to be rinsed may solely be the external piping portion of the milk flow path L3. In this case, in the rinsing process, the control unit 1 opens V6 instead of V5. As a result, it is possible to reduce the discharge amount of rinsing water. While in the present embodiment the bypass pipe L51 is provided, the bypass pipe L51 may be omitted. In this case, one end portion of the bypass pipe L61 is connected to the branching portion Z7, and the other end portion thereof is connected to a predetermined portion of the water flow path L5 between the second check valve C2 and the connection portion Z6.

While in the embodiments the beverage supply apparatus 100 can supply hot beverage (milk or mixed beverage) and cold beverage (milk or mixed beverage), this should not be construed restrictively. It is also possible to solely supply hot beverage or to solely supply cold beverage. Further, while in the present embodiment milk can be supplied apart from mixed beverage, this should not be construed restrictively. It is also possible for the apparatus to solely supply mixed beverage. In the case in which no hot beverage is to be supplied, the inflow pipe L30 from V3 to the connection portion Z9, the heating pipe L31, the delivery pipe L32, and the heating device 6 are unnecessary, and in the case in which no cold beverage is to be supplied, the bypass pipe L34 is unnecessary.

While in the embodiments the beverage supply apparatus 100 can selectively supply milk or mixed beverage, this should not be construed restrictively. With respect to one supply instruction, milk and mixed beverage may be successively supplied, or solely milk may be supplied, or solely mixed beverage may be supplied. Further, not only milk but some other appropriate liquid beverage may be supplied, and not only the mixed beverage of milk and air, a mixed beverage of some other appropriate liquid beverage and air may be supplied. Further, while in the above example the beverage supply apparatus 100 is provided adjacent to the coffee server 50, this should not be construed restrictively. The entire apparatus or a part thereof may be incorporated into the coffee server 50. Further, while in the above example the beverage supply apparatus 100 is used as an option apparatus for the coffee server 50, this should not be construed restrictively. It may also be used as an option apparatus for some other appropriate beverage, or it may also be used singly as a beverage supply apparatus.

The present invention is not limited to the preferred embodiments and the examples of variations described above but allows various variations and modifications based on the technical concept of the present invention.

REFERENCE SYMBOL LIST

3 Milk tank (tank)
7 First pump (beverage conveying pump)
9 Third pump (air supply pump)
10 Beverage delivery port
18 Throttle part
18' Throttle part
100 Beverage supply apparatus
L3 Milk flow path (beverage flow path)
L6 Air flow path
L7 Release path
Z8 Release point
V7 First flow rate adjustment valve
V7' Air flow path opening/closing valve
V9 Release path opening/closing valve (sixth opening/closing valve)
V9' Second flow rate adjustment valve

The invention claimed is:

1. A beverage supply apparatus comprising:
a tank storing a liquid beverage;
a beverage flow path connecting the tank and a beverage delivery port;
a beverage conveying pump provided in the beverage flow path;
an air flow path for causing air to be supplied to the beverage flow path to flow via a predetermined portion of the beverage flow path between the tank and the beverage conveying pump;
an air supply pump provided in the air flow path,
a release path for discharging a portion of the air flowing through the air flow path to the outside, wherein one end portion of the release path is connected to a release point that is a predetermined portion of the air flow path between a beverage flow path side end portion and the air supply pump, and the other end portion of the release path is open to the outside;
a first flow rate adjustment valve provided in a flow path that is a part of the air flow path and extends between the beverage flow path side end portion and the release point, the first flow rate adjustment valve adjusting a flow rate of air flowing through the flow path; and
a release path opening/closing valve provided in the release path, and opening and closing the release path,
wherein the air supply pump is driven to supply air into the beverage flow path and the beverage conveying pump is driven to thereby deliver and supply a mixed beverage of the liquid beverage and the air from the beverage delivery port,
wherein the release path opening/closing valve is open during a mixed beverage supply operation, and is fully closed during an air purge operation in which air is caused to flow through the beverage flow path after the completion of the supply of the mixed beverage, and
wherein during the mixed beverage supply operation, the first flow rate adjustment valve is adjusted in valve opening degree based on a predetermined input signal so as to supply a predetermined flow rate of air to the beverage flow path, and the first flow rate adjustment valve is fully closed during the air purge operation.

2. The beverage supply apparatus according to claim 1, wherein the release path opening/closing valve has a flow rate adjustment function by which the flow rate of air flowing through the release path is adjusted.

3. The beverage supply apparatus according to claim 1,
wherein the tank stores a liquid milk as the liquid beverage, and
wherein the air supply pump is driven to supply air into the beverage flow path, and the beverage conveying pump is driven to thereby deliver and supply a mixed beverage of the liquid milk and the air from the beverage delivery port.

4. The beverage supply apparatus according to claim 1, wherein the air supply pump is configured to be capable of varying the delivery flow rate of air in accordance with a predetermined input signal.

5. A beverage supply apparatus comprising:
a tank storing a liquid beverage;
a beverage flow path connecting the tank and a beverage delivery port;
a beverage conveying pump provided in the beverage flow path;
an air flow path for causing air to be supplied to the beverage flow path to flow via a predetermined portion of the beverage flow path between the tank and the beverage conveying pump;
an air supply pump provided in the air flow path,
a release path for discharging a portion of the air flowing through the air flow path to the outside, wherein one end portion of the release path is connected to a release point that is a predetermined portion of the air flow path between a beverage flow path side end portion and the air supply pump, and the other end portion of the release path is open to the outside;

a second flow rate adjustment valve provided in the release path and adjusting the flow rate of air flowing through the release path to be discharged; and an air flow path opening/closing valve provided in a flow path that is a part of the air flow path and extends between the beverage flow path side end portion and the release point, the air flow path opening/closing valve opens and closes the flow path, wherein the air supply pump is driven to supply air into the beverage flow path and the beverage conveying pump is driven to thereby deliver and supply a mixed beverage of the liquid beverage and the air from the beverage delivery port, wherein the air flow path opening/closing valve is open during a mixed beverage supply operation, and is fully closed during an air purge operation in which air is caused to flow through the beverage flow path after the completion of the supply of the mixed beverage, and wherein during the mixed beverage supply operation, the second flow rate adjustment valve adjusts the valve opening degree based on a predetermined input signal so as to discharge a predetermined flow rate of air, and the second flow rate adjustment valve is fully closed during the air purge operation.

6. The beverage supply apparatus according to claim 5, wherein the air flow path opening/closing valve has a throttle part, wherein the air flow path opening/closing valve is open and causes a predetermined flow rate of air in accordance with a throttle flow path sectional area of the throttle part to flow during the mixed beverage supply operation, and the air flow path opening/closing valve is fully closed during the air purge operation in which air is caused to flow through the beverage flow path after the completion of the supply of the mixed beverage.

7. A beverage supply apparatus comprising:

a tank storing a liquid beverage;

a beverage flow path connecting the tank and a beverage delivery port;

a beverage conveying pump provided in the beverage flow path;

an air flow path for causing air to be supplied to the beverage flow path to flow via a predetermined portion of the beverage flow path between the tank and the beverage conveying pump;

an air supply pump provided in the air flow path, a release path for discharging a portion of the air flowing through the air flow path to the outside, wherein one end portion of the release path is connected to a release point that is a predetermined portion of the air flow path between a beverage flow path side end portion and the air supply pump, and the other end portion of the release path is open to the outside;

a second flow rate adjustment valve provided in the release path and adjusting the flow rate of air flowing through the release path to be discharged; and a throttle part provided in a flow path that is a part of the air flow path and extends between the beverage flow path side end portion and the release point, wherein the air supply pump is driven to supply air into the beverage flow path and the beverage conveying pump is driven to thereby deliver and supply a mixed beverage of the liquid beverage and the air from the beverage delivery port, wherein during both the mixed beverage supply operation and the air purge operation in which air is caused to flow through the beverage flow path after the completion of the supply of the mixed beverage, the throttle part causes a predetermined flow rate of air in accordance with a throttle flow path sectional area thereof to flow, and wherein during the mixed beverage supply operation, the second flow rate adjustment valve adjusts the valve opening degree based on a predetermined input signal so as to discharge a predetermined flow rate of air, and the second flow rate adjustment valve is fully closed during the air purge operation.

* * * * *